(12) United States Patent
Banerjee et al.

(10) Patent No.: US 10,690,823 B2
(45) Date of Patent: Jun. 23, 2020

(54) OMNIDIRECTIONAL STRUCTURAL COLOR MADE FROM METAL AND DIELECTRIC LAYERS

(71) Applicants: Toyota Motor Engineering & Manufacturing North America, Inc., Erlanger, KY (US); Toyota Motor Corporation, Toyota (JP)

(72) Inventors: Debasish Banerjee, Ann Arbor, MI (US); Minjuan Zhang, Ann Arbor, MI (US); Masahiko Ishii, Okazaki (JP)

(73) Assignees: TOYOTA MOTOR CORPORATION, Toyota, Aichi (JP); TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 1010 days.

(21) Appl. No.: 13/913,402

(22) Filed: Jun. 8, 2013

(65) Prior Publication Data
US 2013/0265668 A1    Oct. 10, 2013

Related U.S. Application Data

(63) Continuation-in-part of application No. 13/760,699, filed on Feb. 6, 2013, now abandoned, which is a
(Continued)

(51) Int. Cl.
*G02B 5/22*    (2006.01)
*G02B 5/08*    (2006.01)
*G02B 5/28*    (2006.01)

(52) U.S. Cl.
CPC ............. *G02B 5/22* (2013.01); *G02B 5/085* (2013.01); *G02B 5/0825* (2013.01); *G02B 5/285* (2013.01); *G02B 5/286* (2013.01)

(58) Field of Classification Search
CPC .............................. G02B 5/0825; G02B 5/085
(Continued)

(56) References Cited

U.S. PATENT DOCUMENTS 3,247,392 A    4/1966 Thelen
3,650,790 A    3/1972 Klenke et al.
(Continued)

FOREIGN PATENT DOCUMENTS

CN    1527100 A    9/2004
CN    1741246 A    3/2006
(Continued)

OTHER PUBLICATIONS

Bing-Xin Wei et al., "Detrimental Thixotropic Thinning of Filter Cake of SiO2—Al2O3 Composite Coated TiO2 Particles and Its Control", Industrial & Engineering Chemistry Research, Sep. 27, 2011, 50, pp. 13799-13804.
(Continued)

*Primary Examiner* — Audrey Y Chang
(74) *Attorney, Agent, or Firm* — Dinsmore & Shohl LLP

(57) ABSTRACT

A high-chroma omnidirectional structural color multilayer structure is provided. The structure includes a multilayer stack that has a core layer, a dielectric layer extending across the core layer, and an absorber layer extending across the dielectric layer. An interface is present between the dielectric layer and the absorber layer and a near-zero electric field for a first incident electromagnetic wavelength is present at this interface. In addition, a large electric field at a second incident electromagnetic wavelength is present at the interface. As such, the interface allows for high transmission of the first incident electromagnetic wavelength and high absorption of the second incident electromagnetic wavelength such that a narrow band of reflected light is produced by the multilayer stack.

18 Claims, 11 Drawing Sheets

Related U.S. Application Data continuation-in-part of application No. 13/572,071, filed on Aug. 10, 2012, now abandoned, which is a continuation-in-part of application No. 13/021,730, filed on Feb. 5, 2011, now Pat. No. 9,063,291, which is a continuation-in-part of application No. 12/793,772, filed on Jun. 4, 2010, now Pat. No. 8,736,959, which is a continuation-in-part of application No. 12/388,395, filed on Feb. 18, 2009, now Pat. No. 8,749,881, which is a continuation-in-part of application No. 11/837,529, filed on Aug. 12, 2007, now Pat. No. 7,903,339.

(58) Field of Classification Search
USPC ........ 359/584, 585, 586, 587, 588; 106/403, 106/415
See application file for complete search history.

(56) References Cited

U.S. PATENT DOCUMENTS

| | | | |
|---|---|---|---|
| 3,769,515 | A | 10/1973 | Clark, Jr. |
| 3,885,408 | A | 5/1975 | Clark, Jr. |
| 3,910,681 | A | 10/1975 | Elliott et al. |
| 3,953,643 | A | 4/1976 | Cheung et al. |
| 4,079,605 | A | 3/1978 | Bartels |
| 4,449,126 | A | 5/1984 | Pekker |
| 4,525,028 | A | 6/1985 | Dorschner |
| 4,544,415 | A | 10/1985 | Franz et al. |
| 4,556,599 | A | 12/1985 | Sato et al. |
| 4,613,622 | A | 9/1986 | Moeller et al. |
| 4,643,518 | A | 2/1987 | Taniguchi |
| 4,673,914 | A | 6/1987 | Lee |
| 4,705,839 | A | 11/1987 | Martin |
| 4,714,308 | A | 12/1987 | Sawamura et al. |
| 4,753,829 | A | 6/1988 | Panush |
| 4,756,602 | A | 7/1988 | Southwell et al. |
| 4,868,559 | A | 9/1989 | Pinnow |
| 4,896,928 | A | 1/1990 | Perilloux et al. |
| 5,007,710 | A | 4/1991 | Nakajima et al. |
| 5,043,593 | A | 8/1991 | Tsutsumi et al. |
| RE33,729 | E | 10/1991 | Perilloux |
| 5,132,661 | A | 7/1992 | Pinnow |
| 5,138,468 | A | 8/1992 | Barbanell |
| 5,214,530 | A * | 5/1993 | Coombs et al. ............... 359/359 |
| 5,245,329 | A | 9/1993 | Gokcebay |
| 5,279,657 | A | 1/1994 | Phillips et al. |
| 5,283,431 | A | 2/1994 | Rhine |
| 5,323,416 | A | 6/1994 | Bhat et al. |
| 5,423,912 | A | 6/1995 | Sullivan et al. |
| 5,424,119 | A | 6/1995 | Phillips et al. |
| 5,437,931 | A | 8/1995 | Tsai et al. |
| 5,472,798 | A | 12/1995 | Kumazawa et al. |
| 5,491,470 | A | 2/1996 | Veligdan |
| 5,522,923 | A | 6/1996 | Kimura et al. |
| 5,543,665 | A | 8/1996 | Demarco |
| 5,561,420 | A | 10/1996 | Kleefeldt et al. |
| 5,569,332 | A | 10/1996 | Glatfelter et al. |
| 5,569,353 | A | 10/1996 | Zodrow |
| 5,569,535 | A | 10/1996 | Phillips et al. |
| 5,570,847 | A | 11/1996 | Phillips et al. |
| 5,571,624 | A * | 11/1996 | Phillips ................ B05D 1/286 106/400 |
| 5,653,792 | A | 8/1997 | Phillips et al. |
| 5,691,844 | A | 11/1997 | Oguchi et al. |
| 5,700,550 | A | 12/1997 | Uyama et al. |
| 5,759,255 | A | 6/1998 | Venturini et al. |
| 5,768,026 | A | 6/1998 | Kiyomoto et al. |
| 5,850,309 | A | 12/1998 | Shirai et al. |
| 5,889,603 | A | 3/1999 | Roddy et al. |
| 5,982,078 | A | 11/1999 | Krisl et al. |
| 6,049,419 | A | 4/2000 | Wheatley et al. |
| 6,055,079 | A | 4/2000 | Hagans et al. |
| 6,130,780 | A | 10/2000 | Joannopoulos et al. |
| 6,150,022 | A | 11/2000 | Coulter et al. |
| 6,156,115 | A | 12/2000 | Pfaff et al. |
| 6,157,480 | A | 12/2000 | Anderson et al. |
| 6,157,489 | A | 12/2000 | Bradley, Jr. et al. |
| 6,157,498 | A | 12/2000 | Takahashi |
| 6,164,777 | A | 12/2000 | Li et al. |
| 6,180,025 | B1 | 1/2001 | Schoenfeld et al. |
| 6,215,592 | B1 | 4/2001 | Pelekhaty |
| 6,242,056 | B1 | 6/2001 | Spencer et al. |
| 6,243,204 | B1 * | 6/2001 | Bradley, Jr. ........... C09C 1/0015 106/415 |
| 6,249,378 | B1 | 6/2001 | Shimamura et al. |
| 6,310,905 | B1 | 10/2001 | Shirai |
| 6,331,914 | B1 | 12/2001 | Wood, II et al. |
| 6,383,638 | B1 | 5/2002 | Coulter et al. |
| 6,387,457 | B1 | 5/2002 | Jiang et al. |
| 6,387,498 | B1 | 5/2002 | Coulter et al. |
| 6,399,228 | B1 | 6/2002 | Simpson |
| 6,433,931 | B1 | 8/2002 | Fink et al. |
| 6,451,414 | B1 | 9/2002 | Wheatley et al. |
| 6,475,273 | B1 | 11/2002 | Zimmermann et al. |
| 6,534,903 | B1 | 3/2003 | Spiro et al. |
| 6,565,770 | B1 | 5/2003 | Mayer et al. |
| 6,569,527 | B1 | 5/2003 | Calhoun et al. |
| 6,574,383 | B1 | 6/2003 | Erchak et al. |
| 6,596,070 | B1 | 7/2003 | Schmidt et al. |
| 6,618,149 | B1 | 9/2003 | Stirton |
| 6,624,945 | B2 | 9/2003 | Fan et al. |
| 6,667,095 | B2 | 12/2003 | Wheatley et al. |
| 6,686,042 | B1 * | 2/2004 | LeGallee ...................... 428/403 |
| 6,753,952 | B1 | 6/2004 | Lawrence et al. |
| 6,844,976 | B1 | 1/2005 | Firon et al. |
| 6,873,393 | B2 | 3/2005 | Ma |
| 6,887,526 | B1 | 5/2005 | Arlt et al. |
| 6,894,838 | B2 | 5/2005 | Mizrahi et al. |
| 6,903,873 | B1 | 6/2005 | Joannopoulos et al. |
| 6,913,793 | B2 | 7/2005 | Jiang et al. |
| 6,927,900 | B2 | 8/2005 | Liu et al. |
| 6,997,981 | B1 | 2/2006 | Coombs et al. |
| 7,052,762 | B2 | 5/2006 | Hebrink et al. |
| 7,064,897 | B2 | 6/2006 | Hebrink et al. |
| 7,098,257 | B2 | 8/2006 | Rink et al. |
| 7,106,516 | B2 | 9/2006 | Lotz et al. |
| 7,123,416 | B1 | 10/2006 | Erdogan et al. |
| 7,141,297 | B2 | 11/2006 | Condo et al. |
| 7,184,133 | B2 | 2/2007 | Coombs et al. |
| 7,190,524 | B2 | 3/2007 | Grawert et al. |
| 7,215,473 | B2 | 5/2007 | Fleming |
| 7,236,296 | B2 | 6/2007 | Liu et al. |
| 7,267,386 | B2 | 9/2007 | Hesch |
| 7,326,967 | B2 | 2/2008 | Hsieh et al. |
| 7,329,967 | B2 | 2/2008 | Nozawa et al. |
| 7,352,118 | B2 | 4/2008 | Chowdhury et al. |
| 7,367,691 | B2 | 5/2008 | Lin |
| 7,410,685 | B2 | 8/2008 | Rosenberger et al. |
| 7,413,599 | B2 | 8/2008 | Henglein et al. |
| 7,446,142 | B2 | 11/2008 | Meisenburg et al. |
| 7,452,597 | B2 | 11/2008 | Bujard |
| 7,483,212 | B2 | 1/2009 | Cho et al. |
| 7,638,184 | B2 | 12/2009 | Yaoita et al. |
| 7,667,895 | B2 | 2/2010 | Argoitia et al. |
| 7,699,350 | B2 | 4/2010 | Heim |
| 7,699,927 | B2 | 4/2010 | Henglein et al. |
| 7,745,312 | B2 | 6/2010 | Herner et al. |
| 7,847,342 | B2 | 12/2010 | Fukuzumi et al. |
| 7,851,580 | B2 | 12/2010 | Li et al. |
| 7,859,754 | B2 | 12/2010 | Falicoff |
| 7,863,672 | B2 | 1/2011 | Jin et al. |
| 7,903,339 | B2 | 3/2011 | Banerjee et al. |
| 7,929,730 | B2 | 4/2011 | Huang et al. |
| 7,980,711 | B2 | 7/2011 | Takayanagi et al. |
| 8,013,383 | B2 | 9/2011 | Kidoh et al. |
| 8,257,784 | B2 | 9/2012 | Grayson et al. |
| 8,313,798 | B2 | 11/2012 | Nogueira et al. |
| 8,323,391 | B2 | 12/2012 | Banerjee et al. |
| 8,329,247 | B2 | 12/2012 | Banerjee et al. |
| 8,350,314 | B2 | 1/2013 | Fukuzumi et al. |
| 8,440,014 | B2 | 5/2013 | Kitamura et al. |
| 8,446,666 | B2 | 5/2013 | Kurt et al. |
| 8,542,441 | B2 | 9/2013 | Ouderkirk et al. |

(56) References Cited

U.S. PATENT DOCUMENTS

| | | |
|---|---|---|
| 8,593,728 B2 | 11/2013 | Banerjee et al. |
| 8,599,464 B2 | 12/2013 | Park |
| 8,619,365 B2 | 12/2013 | Harris et al. |
| 8,736,959 B2 | 5/2014 | Grayson et al. |
| 9,063,291 B2 | 6/2015 | Banerjee et al. |
| 2001/0022151 A1 | 9/2001 | Sliwinski et al. |
| 2002/0030882 A1 | 3/2002 | Vitt et al. |
| 2002/0096087 A1 | 7/2002 | Glausch |
| 2002/0117080 A1 | 8/2002 | Okutsu et al. |
| 2002/0129739 A1 | 9/2002 | Yanagimoto et al. |
| 2003/0002157 A1 | 1/2003 | Someno |
| 2003/0059549 A1 | 3/2003 | Morrow et al. |
| 2004/0047055 A1 | 3/2004 | Mizrahi et al. |
| 2004/0156984 A1 | 8/2004 | Vitt et al. |
| 2004/0179267 A1 | 9/2004 | Moon et al. |
| 2004/0191540 A1 | 9/2004 | Jakobi et al. |
| 2004/0246477 A1 | 12/2004 | Moon et al. |
| 2004/0252509 A1 | 12/2004 | Lin |
| 2004/0263983 A1 | 12/2004 | Acree |
| 2004/0265477 A1 | 12/2004 | Nabatova-Gabain et al. |
| 2005/0126441 A1 | 6/2005 | Skelhorn |
| 2005/0132929 A1 | 6/2005 | Raksha et al. |
| 2005/0152417 A1 | 7/2005 | Lin |
| 2005/0235714 A1 | 10/2005 | Lindstrom |
| 2005/0264874 A1 | 12/2005 | Lin |
| 2006/0006402 A1 | 1/2006 | Hsieh et al. |
| 2006/0023327 A1 | 2/2006 | Coombs et al. |
| 2006/0030656 A1 | 2/2006 | Tarng et al. |
| 2006/0081858 A1 | 4/2006 | Lin et al. |
| 2006/0145172 A1 | 7/2006 | Su et al. |
| 2006/0155007 A1 | 7/2006 | Huber |
| 2006/0159922 A1 | 7/2006 | O'Keefe |
| 2006/0222592 A1 | 10/2006 | Burda |
| 2007/0097509 A1 | 5/2007 | Nevitt et al. |
| 2007/0221097 A1 | 9/2007 | Tarng et al. |
| 2009/0046368 A1 | 2/2009 | Banerjee et al. |
| 2009/0082659 A1 | 3/2009 | Ham et al. |
| 2009/0153953 A1 | 6/2009 | Banerjee et al. |
| 2009/0161220 A1 | 6/2009 | Banerjee et al. |
| 2009/0241802 A1 | 10/2009 | Nemoto et al. |
| 2009/0303044 A1 | 12/2009 | Furuichi et al. |
| 2009/0321693 A1 | 12/2009 | Ohkuma et al. |
| 2010/0064938 A1 | 3/2010 | Voit et al. |
| 2010/0208338 A1 | 8/2010 | Banerjee et al. |
| 2010/0209593 A1 | 8/2010 | Banerjee et al. |
| 2010/0213485 A1 | 8/2010 | McKenzie et al. |
| 2011/0091658 A1 | 4/2011 | Banerjee et al. |
| 2011/0113984 A1 | 5/2011 | Fuller, Jr. et al. |
| 2011/0128616 A1 | 6/2011 | Banerjee et al. |
| 2011/0134515 A1 | 6/2011 | Banerjee et al. |
| 2011/0214733 A1 | 9/2011 | den Boer et al. |
| 2011/0228399 A1 | 9/2011 | Ohnishi |
| 2011/0299154 A1 | 12/2011 | Grayson et al. |
| 2012/0050848 A1 | 3/2012 | Carlson et al. |
| 2012/0107584 A1 | 5/2012 | Eibon et al. |
| 2012/0307369 A1 | 12/2012 | Banerjee et al. |
| 2013/0148221 A1 | 6/2013 | Banerjee et al. |
| 2013/0213260 A1 | 8/2013 | Kunii |
| 2013/0250403 A1 | 9/2013 | Maeda |
| 2013/0265668 A1 | 10/2013 | Banerjee et al. |
| 2014/0018439 A1 | 1/2014 | Gruner et al. |
| 2014/0111861 A1 | 4/2014 | Banerjee et al. |
| 2014/0211303 A1 | 7/2014 | Banerjee et al. |
| 2014/0368918 A1 | 12/2014 | Banerjee et al. |
| 2015/0138641 A1 | 5/2015 | Delst et al. |
| 2015/0138642 A1 | 5/2015 | Banerjee et al. |

FOREIGN PATENT DOCUMENTS

| | | |
|---|---|---|
| CN | 101027365 A | 8/2007 |
| CN | 101765791 A | 6/2010 |
| CN | 102132214 A | 7/2011 |
| CN | 102803174 A | 11/2012 |
| CN | 103502333 A | 1/2014 |
| CN | 103507322 A | 1/2014 |
| CN | 103874939 A | 6/2014 |
| CN | 104380150 A | 2/2015 |
| CN | 104619668 A | 5/2015 |
| DE | 2106613 A1 | 8/1971 |
| DE | 19823732 A1 | 12/1999 |
| EP | 141143 B1 | 5/1985 |
| JP | H0246366 A | 2/1990 |
| JP | H0312605 A | 1/1991 |
| JP | H05241017 A | 9/1993 |
| JP | H06016965 A | 1/1994 |
| JP | H06118229 A | 4/1994 |
| JP | 07034324 | 2/1995 |
| JP | H07258579 A | 10/1995 |
| JP | H8-259840 A | 10/1996 |
| JP | H10202813 A | 8/1998 |
| JP | H1112489 A | 1/1999 |
| JP | H11101913 A | 4/1999 |
| JP | H11504953 A | 5/1999 |
| JP | 2000220331 A | 8/2000 |
| JP | 2000329933 A | 11/2000 |
| JP | 2002080749 A | 3/2002 |
| JP | 2002090522 A | 3/2002 |
| JP | 2003053875 A | 2/2003 |
| JP | 2003329824 A | 11/2003 |
| JP | 2004505158 A | 2/2004 |
| JP | 2004134743 A | 4/2004 |
| JP | 2004510013 A | 4/2004 |
| JP | 2004512394 A | 4/2004 |
| JP | 2005513207 A | 5/2005 |
| JP | 2005144925 A | 6/2005 |
| JP | 2006506518 A | 2/2006 |
| JP | 2006097426 A | 4/2006 |
| JP | 3799696 B2 | 7/2006 |
| JP | 2006193738 A | 7/2006 |
| JP | 2006285196 A | 10/2006 |
| JP | 2007065232 A | 3/2007 |
| JP | 2007510022 A | 4/2007 |
| JP | 2007133325 A | 5/2007 |
| JP | 2007183525 A | 7/2007 |
| JP | 2008038382 A | 2/2008 |
| JP | 2008508404 A | 3/2008 |
| JP | 2008510866 A | 4/2008 |
| JP | 2008526002 A | 7/2008 |
| JP | 2008191592 A | 8/2008 |
| JP | 2008209520 A | 9/2008 |
| JP | 2008230218 A | 10/2008 |
| JP | 2008257777 A | 10/2008 |
| JP | 2009427633 A | 2/2009 |
| JP | 2009511725 A | 3/2009 |
| JP | 2010502433 A | 1/2010 |
| JP | 2010526015 A | 7/2010 |
| JP | 2010191431 A | 9/2010 |
| JP | 4948706 B2 | 6/2012 |
| JP | 2013518946 A | 5/2013 |
| JP | 2014237819 A | 12/2014 |
| JP | 2015120350 A | 7/2015 |
| JP | 2016027095 A | 2/2016 |
| JP | 2016049777 A | 4/2016 |
| WO | 9936258 A1 | 1/1999 |
| WO | 99/42892 A1 | 8/1999 |
| WO | 0012634 A1 | 3/2000 |
| WO | 2000/022466 A1 | 4/2000 |
| WO | 0031571 A1 | 6/2000 |
| WO | 02054030 A2 | 7/2002 |
| WO | 03062871 A1 | 7/2003 |
| WO | 2015153043 A1 | 10/2015 |

OTHER PUBLICATIONS

Hongqiang et al, "Disordered dielectric high reflectors with broadband from visible to infrared," Applied Physics Letters, American Institute of Physics, Melville, NY, US, vol. 74, No. 22, dated May 31, 2009.

Xifre-Perez et al, "Porous silicon mirrors with enlarged omnidirectional band gap," Journal of Applied Physics, American Institute of Physics, Melville, NY, US, vol. 97, No. 6, dated Mar. 9, 2005.

(56) References Cited

OTHER PUBLICATIONS

"Laser 2000 Gmbttp://www.laser2000.de/fileadmin/Produkdaten/SK_WEB/Datenblaetter_SEM/SEMROCK-StopLine-Notchfilterpdf, accessed Feb. 2, 2010".
Bendiganavale A.K., Malshe, V.C., "Infrared Reflective Inorganic Pigments", Recent Patents on Chemical Engineering, 2008, 1, 67-79.
D.P. Young, Jr., et al. "Comparison of Avian Responses to UV-Light Reflective Paint on Wind Turbines," National Renewable Energy Laboratory, Subcontract Report, Jan. 2003.
Maier, E.J. "To Deal With the Invisible: On the biological significance of ultraviolet sensitivity in birds." Naturwissenschaften 80: 476-478, 1993.
Nison, J., "Twinkle, Twinkle Little Star," Asia Pacific Coating Journal, Feb. 2004.
Fink, Joel "A Dielectric Omnidirectional Reflector", E.L. Thomas, Science, vol. 282, Nov. 27, 1988.
Lin, Weihua, "Design and Fabrication of Omnidirectional Reflectors in the Visible Range" Journal of Modern Optics, vol. 52, No. 8, 1155 (2005).
Chen, Kevin M. "Si02/Ti02 Omnidirectional Reflector and Microcavity Resonator Via the Sol-Gel Method", Appl. Phys. Lett., vol. 75, No. 24, Dec. 13, 1999.
Almedia, R.M., "Photonic Bandgap Materials and Structures by Sol-Gel Processing", Journal of Non-Crystalline Solids, 405-499 (2003).
Decourby, R.G., "Planar Omnidirectional Reflectors in Chalcogenide Glass and Polymer" Optics Express, 6228, Aug. 8, 2005.
Clement, T.J., "Improved Omnidirectional Reflectors in Chalcogenide Glass and Polymer by Using the Silver Doping Tachnique", Optics Express, 14, 1789 (2006).
Bryant, A., "All-Silicon Omnidirectional Mirrors Based on One-Dimensional Crystals", Appl. Phys. Lett. vol. 82, No. 19, May 12, 2003.
Chigrin, D.N., "Observation of Total Omnidirectional Reflection From a One-Dimensional Dielectric Lattice", Appl. Phys. A. 68, 25-28 (1999).
Park, Y., "GaAs-based Near-infrared Omnidirectional Reflector", Appl. Phys. Lett., vol. 82, No. 17, Apr. 28, 2003.
H-Y Lee, "Design and Evaluation of Omnidirectional One-Dimensional Photonic Crystals", Journal of Appl. Phys. vol. 93, No. 2, Jan. 15, 2003.
Banerjee, Debasish, "Narrow-band Omnidirectional Structural Color", SAE World Congress 01-1049 (2008).
U.S. Appl. No. 13/760,699, filed Feb. 6, 2013.
U.S. Appl. No. 13/572,071, filed Aug. 10, 2012.
U.S. Appl. No. 13/021,730, filed Feb. 5, 2011.
U.S. Appl. No. 12/793,772, filed Jun. 4, 2010.
U.S. Appl. No. 12/388,395, filed Feb. 18, 2009.
U.S. Appl. No. 13/014,398, filed Jan. 26, 2011.
Sajeev John et al., "Photonic Band Gap Materials: A Semiconductor for Light", Department of Physics, University of Toronto, p. 1-23; 2001.
Distributed Bragg Reflector; en.wikipedia.org/wiki/Bragg_reflector (2005).
Photonic Crystal; en.wikipedia.org/wiki/Photonic_crystals (2003).
Tikhonravov, et al., "Application of the Needle Optimization Technique to the Design of Optical Coatings", Applied Optics, Optical Society of America, 1996, pp. 5493-5508, vol. 35, No. 28.
Tikhonravov, Alexander V. et al., "Optical Coating Design Algorithm Based on the Equivalent Layers Theory", Applied Optics: vol. 45, No. 7; Mar. 2006; pp. 1530-1538.
Kaminska, Kate et al., "Birefringent Omnidirectional Reflector", Applied Optics, vol. 43, No. 7, Mar. 2004, pp. 1570-1576.
Deopura, M. "Dielectric Omnidirectional Visible Reflector," Optics Letters, Aug. 1, 2001, vol. 16, No. 15.
Schmid, Raimund and Mronga, Norbert, "A New Generation of Sparkling Effect Pigments", Paint & Coatings Industry; Oct. 2004, vol. 20 Issue 10, p. 118-121.

Office Action dated Sep. 5, 2018 pertaining to Japanese Patent Application No. 2014-117702.
Office Action dated Jun. 4, 2019 pertaining to Japanese Patent Application No. 2014-117702.
Office Action dated Sep. 30, 2018 pertaining to Chinese Patent Application No. 201410693385.4.
Office Action dated Apr. 22, 2019 pertaining to Chinese Patent Application No. 201410693385.4.
Office Action dated Sep. 21, 2018 pertaining to German Patent Application No. 10 2014 119 261.3.
Office Action dated Feb. 5, 2019 pertaining to Japanese Patent Application No. 2016-559529.
Office Action dated Jul. 12, 2018 pertaining to Chinese Patent Application No. 201580026216.8.
Office Action dated Apr. 1, 2019 pertaining to Chinese Patent Application No. 201580026216.8.
Office Action dated Oct. 9, 2019 pertaining to Chinese Patent Application No. 201580026216.8.
International Preliminary Report on Patentability dated Oct. 4, 2016 pertaining to PCT/US2015/018640, filed Mar. 4, 2015.
International Search Report and Written Opinion dated May 29, 2015 pertaining to PCT/US2015/018640, filed Mar. 4, 2015.
Office Action dated Nov. 2, 2018 pertaining to Chinese Patent Application No. 201510498432.4.
Office Action dated Jun. 28, 2019 pertaining to Chinese Patent Application No. 201510498432.4.
Office Action dated Dec. 3, 2019 pertaining to Chinese Patent Application No. 201510498432.4.
Office Action dated May 28, 2019 pertaining to Japanese Patent Application No. 2015-160731.
Office Action dated Mar. 20, 2018 pertaining to Japanese Patent Application No. 2015-169044.
Office Action dated Feb. 8, 2018 pertaining to German Patent Application No. 102015113535.3.
Office Action dated Sep. 4, 2018 pertaining to Chinese Patent Application No. 201510624641.9.
Office Action dated Nov. 5, 2019 pertaining to Japanese Patent Application No. 2016-014076.
Office Action dated Jul. 16, 2019 pertaining to Chinese Patent Application No. 201610040211.7.
Office Action dated Oct. 29, 2018 pertaining to Chinese Patent Application No. 201610397388.2.
Office Action dated Jun. 4, 2019 pertaining to Chinese Patent Application No. 201610397388.2.
Office Action dated May 29, 2018 pertaining to Japanese Patent Application No. 2016-113282.
Office Action dated Apr. 16, 2019 pertaining to Japanese Patent Application No. 2016-113282.
Office Action dated Oct. 29, 2018 pertaining to Chinese Patent Application No. 201610397718.8.
Office Action dated Jun. 5, 2018 pertaining to Japanese Patent Application No. 2016-113434.
Office Action dated Oct. 25, 2018 pertaining to Chinese Patent Application No. 201610395759.3.
Office Action dated Jun. 4, 2019 pertaining to Chinese Patent Application No. 201610395759.3.
Office Action dated May 29, 2018 pertaining to Japanese Patent Application No. 2016-113285.
Office Action dated Apr. 16, 2019 pertaining to Japanese Patent Application No. 2016-113285.
Office Action dated Jul. 10, 2019 pertaining to Chinese Patent Application No. 201710284783.4.
Office Action dated Sep. 18, 2018 pertaining to Japanese Patent Application No. 2017-085886.
Office Action dated Jun. 4, 2019 pertaining to Japanese Patent Application No. 2017-085886.
Office Action dated Jan. 23, 2013 pertaining to Japanese Patent Application No. 2008-208255.
Office Action dated Feb. 26, 2014 pertaining to Japanese Patent Application No. 2008-208255.
Office Action dated Sep. 30, 2014 pertaining to Japanese Patent Application No. 2008-208255.

(56) References Cited

OTHER PUBLICATIONS

Office Action dated Jan. 30, 2017 pertaining to Japanese Patent Application No. 2010-114777.
Office Action dated Jan. 29, 2015 pertaining to Japanese Patent Application No. 2011-126545.
Office Action dated Jun. 23, 2015 pertaining to Japanese Patent Application No. 2011-126545.
Office Action dated Jan. 27, 2014 pertaining to Japanese Patent Application No. 2011-213056.
Office Action dated Nov. 20, 2014 pertaining to Japanese Patent Application No. 2011-213056.
Office Action dated Aug. 15, 2017 pertaining to Japanese Patent Application No. 2013-167895.
Office Action dated Feb. 20, 2018 pertaining to Japanese Patent Application No. 2013-167895.

* cited by examiner

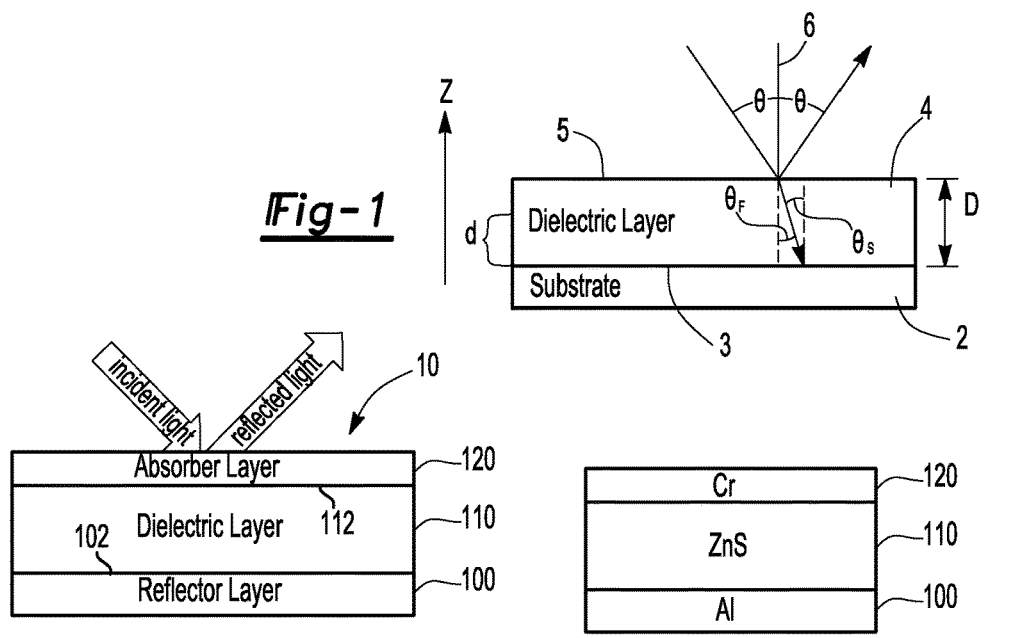
Fig-1
Fig-2
Fig-3a
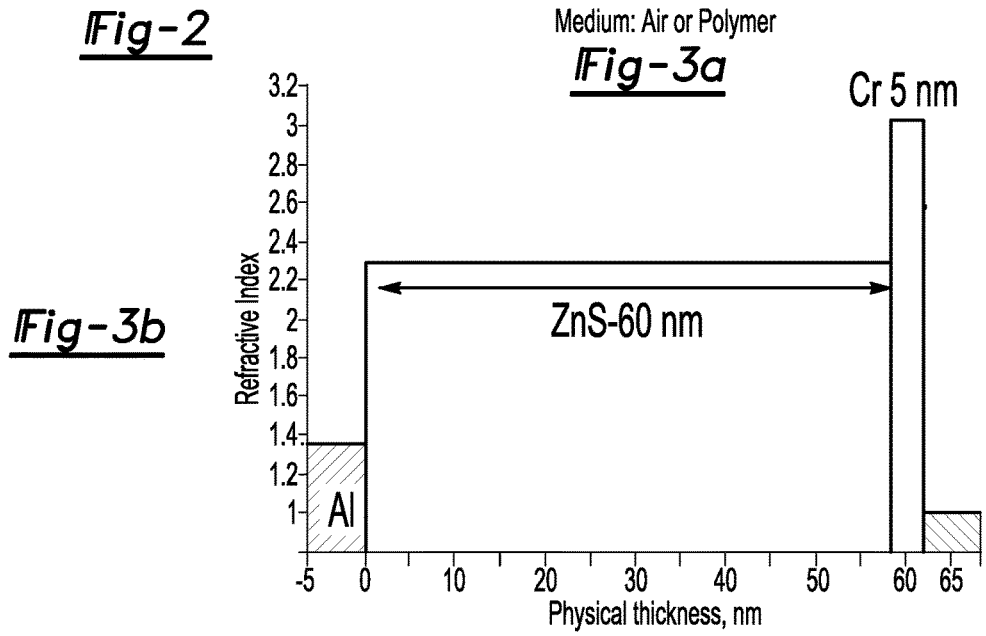
Fig-3b
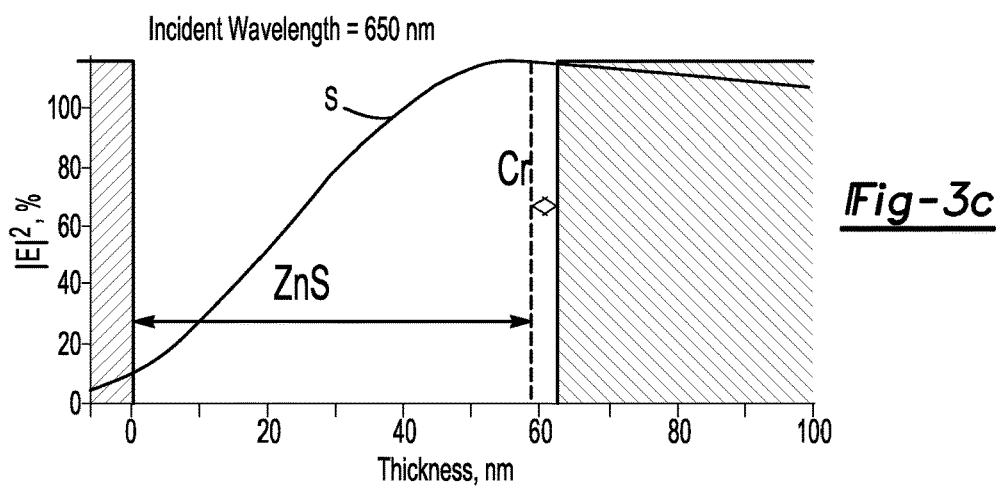
Fig-3c

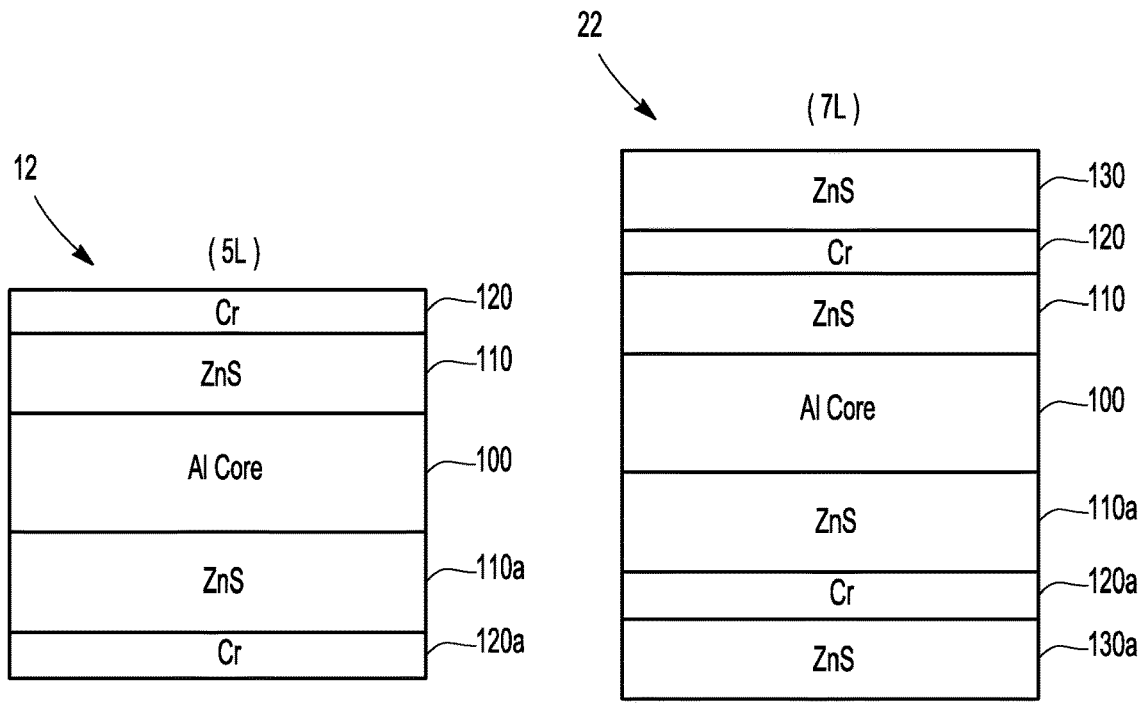
*Fig-9a*
*Fig-9b*
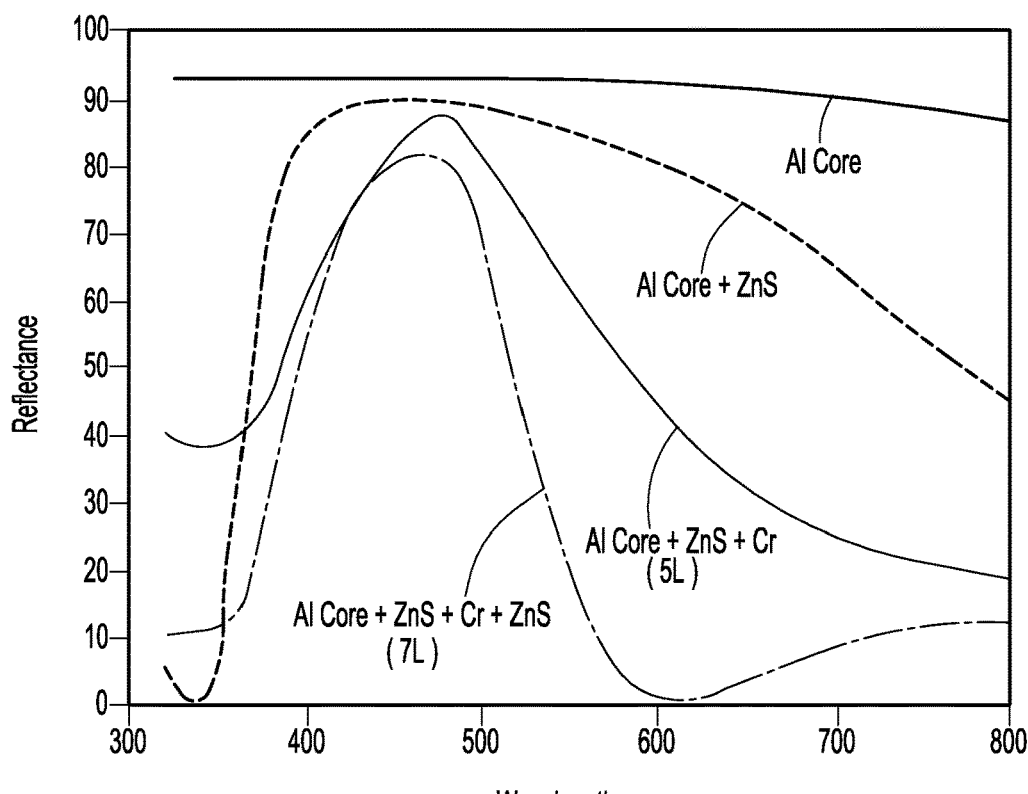
*Fig-9c*

OMNIDIRECTIONAL STRUCTURAL COLOR MADE FROM METAL AND DIELECTRIC LAYERS

CROSS REFERENCE TO RELATED APPLICATIONS

The instant application is a continuation-in-part (CIP) of U.S. patent application Ser. No. 13/760,699 filed on Feb. 6, 2013, which in turn is a CIP of U.S. patent application Ser. No. 13/021,730 filed on Feb. 5, 2011, which in turn is a CIP of U.S. patent application Ser. No. 12/974,606 (now U.S. Pat. No. 8,323,391) filed on Dec. 21, 2010, which in turn is a CIP of U.S. patent application Ser. No. 12/388,395 filed on Feb. 18, 2009, which in turn is a CIP of U.S. patent application Ser. No. 11/837,529 (now U.S. Pat. No. 7,903,339) filed on Aug. 12, 2007.

The instant application is also a CIP of U.S. patent application Ser. No. 12/893,152 filed on Sep. 29, 2010, which in turn is a CIP of U.S. patent application Ser. No. 12/467,656 filed on May 18, 2009.

The instant application is also a CIP of U.S. patent application Ser. No. 12/793,772 filed on Jun. 4, 2010.

The instant application is also a CIP of U.S. patent application Ser. No. 13/572,071 filed on Aug. 10, 2012, which in turn is a CIP of U.S. patent application Ser. No. 13/021,730 filed on Feb. 5, 2011, which in turn is a CIP of U.S. patent application Ser. No. 12/793,772 filed on Jun. 4, 2010, which in turn is a CIP of U.S. patent application Ser. No. 11/837,529 filed on Aug. 12, 2007 (now U.S. Pat. No. 7,903,339).

The instant application is also a CIP of U.S. patent application Ser. No. 13/014,398 filed Jan. 26, 2011, which in turn is a CIP of U.S. patent application Ser. No. 12/793,772 filed on Jun. 4, 2010, which in turn is a CIP of U.S. patent application Ser. No. 12/686,861 filed on Jan. 13, 2010, which in turn is a CIP of U.S. patent application Ser. No. 12/389,256 filed on Feb. 19, 2009 (now U.S. Pat. No. 8,329,247).

FIELD OF THE INVENTION

The present invention is related to an omnidirectional structural color, and in particular, to an omnidirectional structural color provided by metal and dielectric layers.

BACKGROUND OF THE INVENTION

Pigments made form multilayer structures are known. In addition, pigments that exhibit or provide a high-chroma omnidirectional structural color are also known. However, such prior art pigments have required as many as 39 thin film layers in order to obtain desired color properties. It is appreciated that the costs associated with the production of thin film multilayer pigments is proportional to the number of layers required and the costs associated with the production of high-chroma omnidirectional structural colors using multilayer stacks of dielectric materials can be prohibitive. Therefore, a high-chroma omnidirectional structural color that requires a minimum number of thin film layers would be desirable.

SUMMARY OF THE INVENTION

A high-chroma omnidirectional structural color multilayer structure is provided. The structure includes a multilayer stack that has a core layer, which can also be referred to as a reflector layer, a dielectric layer extending across the core layer, and an absorber layer extending across the dielectric layer. An interface is present between the dielectric layer and the absorber layer, and a near-zero electric field for a first incident electromagnetic wavelength and a large electric field at a second incident electromagnetic is present at the interface. As such, the interface allows for high transmission of the first incident electromagnetic wavelength through the interface, through the dielectric layer with reflectance off of the core/reflector layer. However, the interface affords for high absorption of the second incident electromagnetic wavelength. Therefore, the multilayer stack produces or reflects a narrow band of light.

The core layer can have a complex refractive index represented by the expression $RI_1 = n_1 + ik_1$ with $n_1 \ll k_1$, where $RI_1$ is the complex refractive index, $n_1$ is a refractive index of the core layer, $k_1$ is an extinction coefficient of the core layer, and i is $\sqrt{-1}$. In some instances, the core layer is made from silver, aluminum, gold, or alloys thereof and preferably has a thickness between 50 and 200 nanometers (nm).

The dielectric layer has a thickness of less than or equal to twice the quarter wave (QW) of a center wavelength of a desired narrow band of reflected light. In addition, the dielectric layer can be made from titanium oxide, magnesium fluoride, zinc sulfide, hafnium oxide, tantalum oxide, silicon oxide, or combinations thereof.

The absorber layer has a complex refractive index in which the refractive index is approximately equal to the extinction coefficient. Such a material includes chromium, tantalum, tungsten, molybdenum, titanium, titanium nitride, niobium, cobalt, silicon, germanium, nickel, palladium, vanadium, ferric oxide, and combinations or alloys thereof. In addition, the thickness of the absorber layer is preferably between 5 and 20 nm.

In some instances, the multilayer structure includes another dielectric layer extending across an outer surface of the absorber layer. Also, another absorber layer can be included between the core layer and the first dielectric layer. Such structures provide a high-chroma omnidirectional structural color with a minimum of two layers on a core layer.

BRIEF DESCRIPTION OF THE DRAWINGS

FIG. 1 is a schematic illustration of a single dielectric layer on a substrate;

FIG. 2 is high-chroma omnidirectional structural color multilayer structure according to an embodiment of the present invention;

FIGS. 3a-3d are: (a) a schematic illustration of an embodiment of the present invention; (b) a graphical representation of refractive indices for the embodiment shown in (a); (c) a graphical representation of electric field through the thickness of the embodiment shown in (a) for an incident wavelength of 650 nm; and (d) a graphical representation of electric field across the embodiment shown in (a) for an incident wavelength of 400 nm;

FIGS. 9a-9c are: (a) a schematic illustration of a 5-layer (5L) embodiment according to the present invention; (b) a schematic illustration of a 7-layer (7L) embodiment according to the present invention; and (c) a graphical representation of reflectance versus incident light wavelength for a single Al layered structure (Al Core), an Al Core+ZnS Layer structure (Al Core+ZnS), the 5-layer structure illustrated in (a) and the 7-layer structure illustrated in (b);

DETAILED DESCRIPTION OF THE INVENTION

Figure 3D:
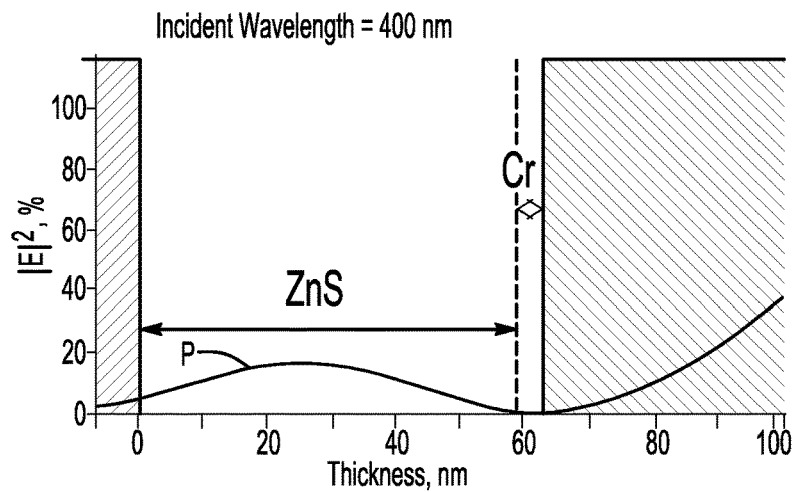

A high-chroma omnidirectional structural color multilayer structure is provided. As such, the multilayer structure has use as a paint pigment, a thin film that provides a desired color, and the like.

The high-chroma omnidirectional structural color multilayer structure includes a core layer and a dielectric layer extending across the core layer. In addition, an absorber layer extends across the dielectric layer with an interface therebetween. The thickness of the absorber layer and/or dielectric layer is designed and/or fabricated such that the interface between the two layers exhibits a near-zero electric field at a first incident electromagnetic wavelength and a large electric field at a second incident electromagnetic wavelength—the second incident electromagnetic wavelength not being equal to the first incident electromagnetic wavelength.

It should be appreciated that the near-zero electric field at the interface affords for a high percentage of the first incident electromagnetic wavelength to be transmitted therethrough, whereas the large electric field affords for a high percentage of the second incident electromagnetic wavelength to be absorbed by the interface. In this manner, the multilayer structure reflects a narrow band of electromagnetic radiation, e.g. a narrow reflection band of less than 400 nanometers, less than 300 nanometers, or less than 200 nanometers. In addition, the narrow reflection band has a very low shift of its center wavelength when viewed from different angles, e.g. angles between 0 and 45 degrees, 0 and 60 degrees and/or 0 and 90 degrees.

The core layer is made from a material such that its complex refractive index has a refractive index that is much less than an extinction coefficient for the material where the complex refractive index is represented by the expression $RI_1=n_1+ik_1$, and $n_1$ is the refractive index of the core layer material, $k_1$ is the extinction coefficient of the core layer material and i is the square root of −1. Materials that fall within this criterion include silver, aluminum, gold, and alloys thereof. In addition, the thickness of the core layer can be between 10 and 500 nanometers in some instances, between 25 and 300 nanometers in other instances, and between 50 and 200 nanometers in yet other instances.

The dielectric layer has a thickness of less than or equal to twice the quarter wave (2 QW) of a center wavelength of the narrow reflection band. In addition, the dielectric layer can be made from a titanium oxide (e.g., $TiO_2$), magnesium fluoride (e.g., $MgF_2$), zinc sulfide (e.g., ZnS), hafnium oxide (e.g., $HfO_2$), niobium oxide (e.g., $Nb_2O_5$), tantalum oxide (e.g., $Ta_2O_5$), silicon oxide (e.g., $SiO_2$), and combinations thereof.

Regarding the absorber layer, a material having a refractive index generally equal to an extinction coefficient for the material is used. Materials that meet this criteria include chromium, tantalum, tungsten, molybdenum, titanium, titanium nitride, niobium, cobalt, silicon, germanium, nickel, palladium, vanadium, ferric oxide, and/or alloys or combinations thereof. In some instances, the thickness of the absorber layer is between 5 and 50 nanometers, while in other instances the thickness is between 5 and 20 nanometers.

Regarding the electric field across a thin film structure and a desired thickness of a dielectric layer, and not being bound by theory, FIG. 1 is schematic illustration of a dielectric layer 4 having a total thickness 'D', an incremental thickness 'd' and an index of refraction 'n' on a substrate or core layer 2 having a index of refraction $n_s$. Incident light strikes the outer surface 5 of the dielectric layer 4 at angle θ relative to line 6 which is perpendicular to the surface and reflects from the outer surface 5 at the same angle. Incident light is transmitted through the outer surface 5 and into the dielectric layer 4 at an angle $θ_F$ relative to the line 6 and strikes the surface 3 of substrate layer 2 at an angle $θ_s$ as shown in the figure.

For a single dielectric layer, $\theta_s = \theta_F$ and the electric filed (E) can be expressed as E(z) when z=d. From Maxwell's equations, the electric field can be expressed for s polarization as:

$$E(d) = \{u(z),0,0\}\exp(ik\alpha y)|_{z=d} \quad (1)$$

and for p polarization as:

$$\vec{E}(d) = \left\{0, u(z), -\frac{\alpha}{\tilde{\varepsilon}(z)}v(z)\right\}\exp(ik\alpha y)\bigg|_{z=d} \quad (2)$$

where $$k = \frac{2\pi}{\lambda}$$

and $\lambda$ is a desired wavelength to be reflected. Also, $\alpha = n_s \sin\theta_s$ where 's' corresponds to the substrate in FIG. 1. As such, $$|E(d)|^2 = |u(z)|^2 \exp(2ik\alpha y)|_{z=d} \quad (3)$$

for s polarization and $$|E(d)|^2 = \left[|u(z)|^2 + \left|\frac{\alpha}{\sqrt{n}}v(z)\right|^2\right]\exp(2ik\alpha y)\bigg|_{z=d} \quad (4)$$

for p polarization.

It is appreciated that variation of the electric field along the Z direction of the dielectric layer 4 can be estimated by calculation of the unknown parameters u(z) and v(z) where it can be shown that:

$$\begin{pmatrix} u \\ v \end{pmatrix}_{z=d} = \begin{pmatrix} \cos\varphi & (i/q)\sin\varphi \\ iq\sin\varphi & \cos\varphi \end{pmatrix}\begin{pmatrix} u \\ v \end{pmatrix}_{z=0,substrate} \quad (5)$$

Using the boundary conditions $u|_{z=0}=1$, $v|_{z=0}=q_s$, and the following relations:

$$q_s = n_s \cos\theta_s \text{ for } s\text{-polarization} \quad (6)$$

$$q_s = n_s/\cos\theta_s \text{ for } p\text{-polarization} \quad (7)$$

$$q = n \cos\theta_F \text{ for } s\text{-polarization} \quad (8)$$

$$q = n/\cos\theta_F \text{ for } p\text{-polarization} \quad (9)$$

$$\varphi = k \cdot n \cdot d \cos(\theta_F) \quad (10)$$

u(z) and v(z) can be expressed as:

$$u(z)|_{z=d} = u|_{z=0}\cos\varphi + v|_{z=0}\left(\frac{i}{q}\sin\varphi\right) \quad (11)$$
$$= \cos\varphi + \frac{i \cdot q_s}{q}\sin\varphi$$

and $$v(z)|_{z=d} = iqu|_{z=0}\sin\varphi + v|_{z=0}\cos\varphi \quad (12)$$
$$= iq\sin\varphi + q_s\cos\varphi$$

Therefore:

$$|E(d)|^2 = \left[\cos^2\varphi + \frac{q_s^2}{q^2}\sin^2\varphi\right]e^{2ik\alpha y} \quad (13)$$
$$= \left[\cos^2\varphi + \frac{n_s^2}{n^2}\sin^2\varphi\right]e^{2ik\alpha y}$$

for s polarization with $\varphi = k \cdot n \cdot d \cos(\theta_F)$, and:

$$|E(d)|^2 = \left[\cos^2\varphi + \frac{n_s^2}{n^2}\sin^2\varphi + \frac{\alpha^2}{n}(q_s^2\cos^2\varphi + q^2\sin^2\varphi)\right] \quad (14)$$
$$= \left[\left(1 + \frac{\alpha^2 q_s^2}{n}\right)\cos^2\varphi + \left(\frac{n_s^2}{n^2} + \frac{\alpha^2 q^2}{n}\right)\sin^2\varphi\right]$$

for p polarization where:

$$\alpha = n_s \sin\theta_s = n\sin\theta_F \quad (15)$$

$$q_s = \frac{n_s}{\cos\theta_s} \quad (16)$$

and $$q_s = \frac{n}{\cos\theta_F} \quad (17)$$

Thus for a simple situation where $\theta_F = 0$ or normal incidence, $\varphi = k \cdot n \cdot d$, and $\alpha = 0$:

$$|E(d)|^2 \text{ for } s\text{-polarization} = |E(d)|^2 \text{ for } p\text{-polarization} \quad (18)$$
$$= \left[\cos^2\varphi + \frac{n_s^2}{n^2}\sin^2\varphi\right]$$
$$= \left[\cos^2(k \cdot n \cdot d) + \frac{n_s^2}{n^2}\sin^2(k \cdot n \cdot d)\right] \quad (19)$$

which allows for the thickness 'd' to be solved for when the electric field is zero.

The inventive multilayer structures can include a five layer structure with a central core layer with a pair of dielectric layers on opposite sides of the core layer and a pair of absorber layers extending across an outer surface of the dielectric layers. A seven layer multilayer structure is included in which another pair of dielectric layers extend across outer surfaces of the two absorber layers. A different seven layer structure is included in which the initial five layer structure described above includes a pair of absorber layers that extend between opposite surfaces of the core layer and the dielectric layer. In addition, a nine layer multilayer structure is included in which yet another pair of absorber layers extend between the opposite surfaces of the core layer and the dielectric layer for the seven layer structure described above.

Turning now to FIG. 2, an embodiment of a high-chroma omnidirectional structural color multilayer structure is shown generally at reference numeral 10. The multilayer structure 10 has a core or reflector layer 100 with a dielectric layer 110 extending across an outer surface 102 of the reflector layer 100. In addition, an absorber layer 120 extends across the dielectric layer 110 with an interface 112 therebetween. As shown in FIG. 2, incident light is transmitted to and strikes the multilayer structure 10 and reflected light is reflected therefrom.

With reference to FIG. 3, a specific embodiment is shown in FIG. 3(a) in which the core layer 100 is made from aluminum, the dielectric layer 110 is made from ZnS, and the absorber layer 120 is made from chromium FIG. 3(b) provides a graph showing the refractive index for the aluminum core layer 100, the ZnS dielectric layer 110, and the chromium absorber layer 120. Also shown in FIG. 3(b) are the thicknesses of the dielectric layer 110 (60 nm) and the absorber layer 120 (5 nm).

FIGS. 3(c) and 3(d) provide a graphical illustration of the electric field ($|E|^2$ in %) as a function of the thickness of the multilayer structure shown in FIG. 3(a). As shown in FIGS. 3(c) and 3(d), at a wavelength of 650 nm, a relatively large electric field exists at the interface between the ZnS dielectric layer and the chromium absorber layer. In contrast, at an incident wavelength of 400 nm, the electric field is near-zero at the interface between the ZnS dielectric layer and the chromium absorber layer. For the purposes of the instant disclosure, the term "near-zero" is defined to be less than 25% $|E|^2$ in some instances, less than 10% $|E|^2$ in other instances, and less than 5% in yet other instances.

It is appreciated from the graphical representations shown in FIGS. 3(c) and 3(d) that wavelengths within the 400 nm region will pass through the interface 112, whereas wavelengths within the 650 nm region will be absorbed at the interface 112. As such, a narrow band of reflected electromagnetic radiation is produced by the multilayer structure 10 by the transmission of electromagnetic radiation in the 400 nm range through the interface 112, through the ZnS dielectric layer 110, reflection from the core layer 100, and subsequent transmission of the reflected electromagnetic radiation through the dielectric layer 110, interface 112, and absorber layer 120. In this manner, a narrow band of reflected light is provided and thus affords for a structural color.

Figure 4A:
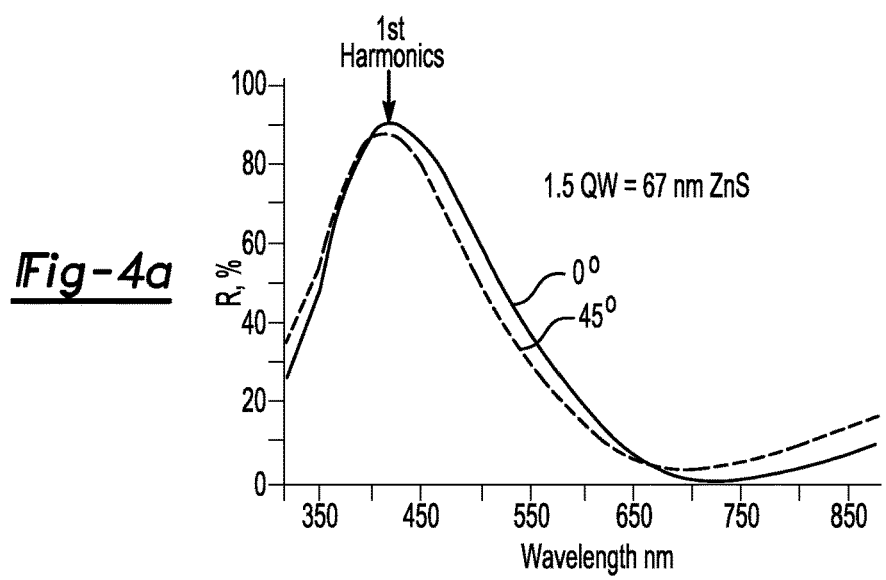
FIGS. 4a-4d are graphical representations of reflectance versus incident light wavelength for the embodiment shown in FIG. 3(a) when viewed at 0 and 45 degrees and with the embodiment having: (a) having a dielectric layer thickness of 1.5 QW; (b) a dielectric layer thickness of 3 QW; (c) a dielectric layer thickness of 3.6 QW; and (d) a dielectric layer thickness of 6 QW.
Figure 4B:
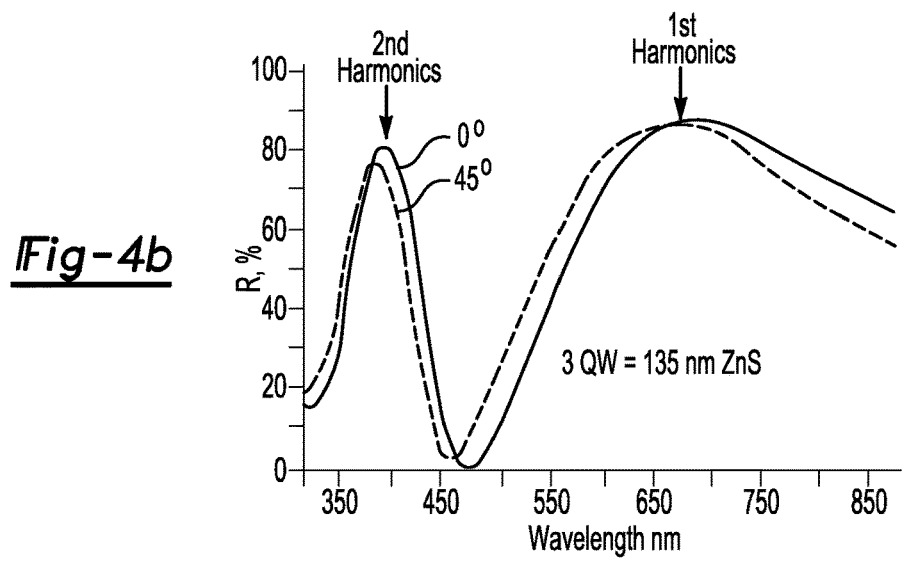
Figure 4C:
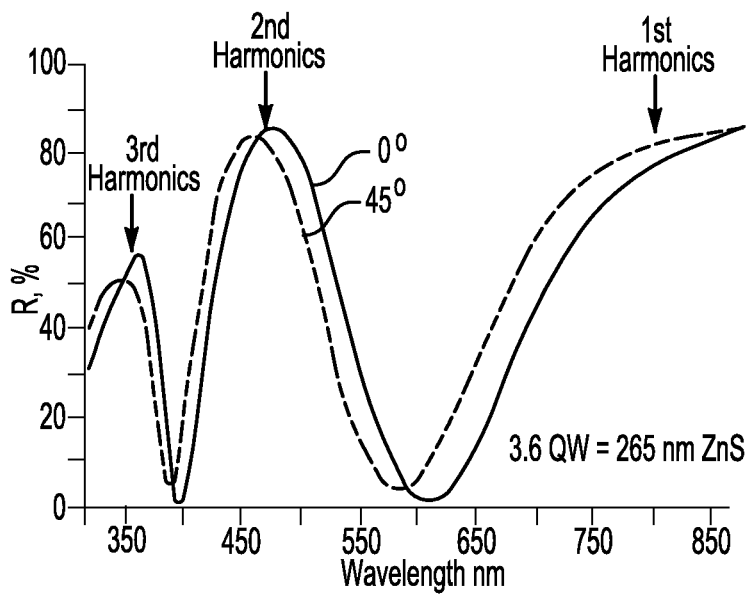
Figure 4D:
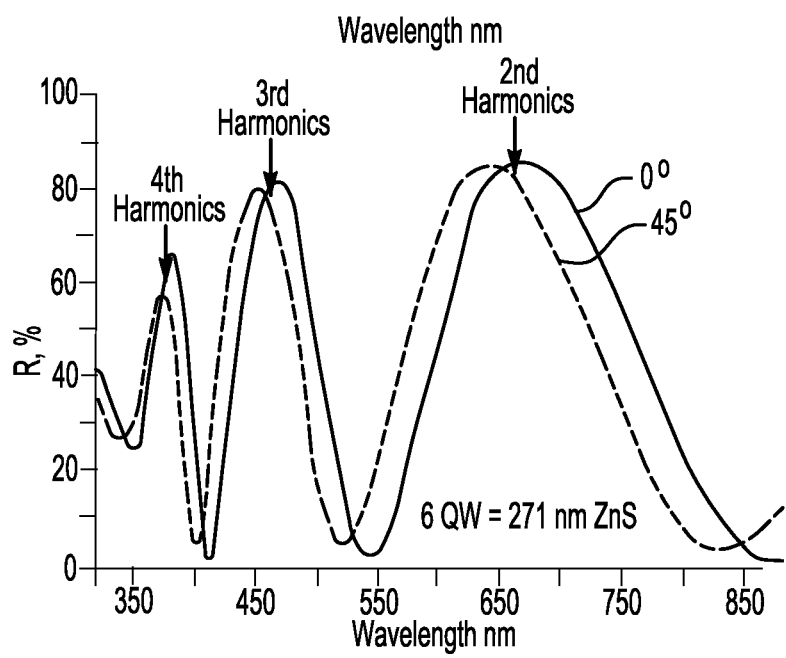

Regarding omnidirectional behavior of the multilayer structure 10, the thickness of the dielectric layer 110 is designed or set such that only the first harmonics of reflected light is provided. In particular, and referring to FIG. 4, FIG. 4(a) illustrates the reflection characteristics of the multilayer structure 10 when viewed from 0 and 45 degrees and the dielectric layer 110 has a thickness of 1.5 QW of the desired 400 nm wavelength which equates to 67 nm. As shown in FIG. 4(a), and as opposed to FIGS. 4(b)-4(d), only the first harmonics of the reflected narrow band of electromagnetic radiation is provided. In particular, for dielectric layer thicknesses greater than 2 QW, second, third, and fourth harmonics. Therefore, the thickness of the dielectric layer 110 is critical in order to provide an omnidirectional structural color.

Figure 5:
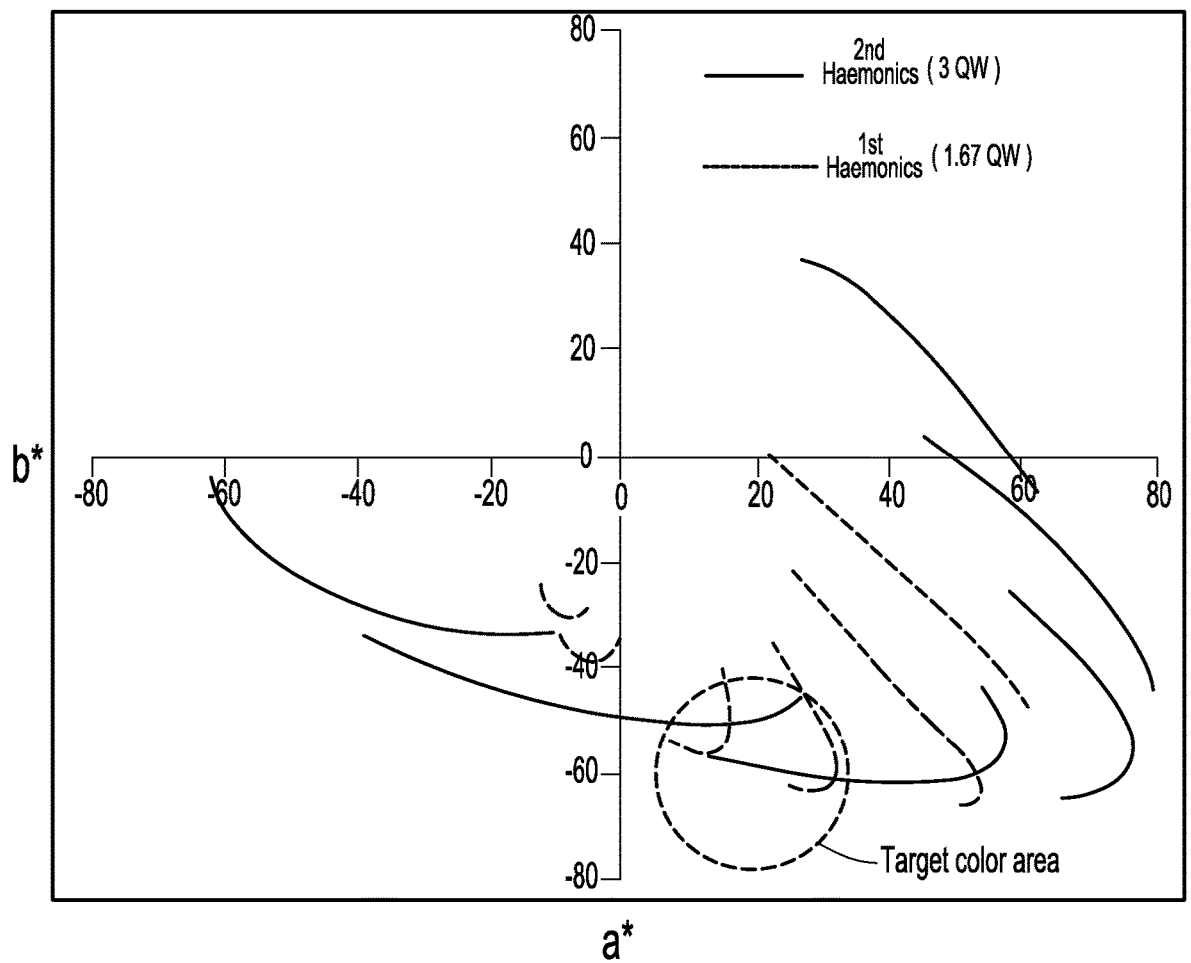
FIG. 5 is a graphical representation of a comparison between color properties on an a*b* color map for a targeted color area of hue equal to 280.

Turning now to FIG. 5, a comparison of color properties for a multilayer structure can be examined using an a*b* color map that uses the CIELAB color space. It is appreciated that the CIELAB color space is a color-opponent space with dimension L* for lightness and a* and b* for the color-opponent dimensions, based on nonlinearly compressed CIE space XYZ color space coordinates. The a* axis is perpendicular to the b* axis and forms the chromaticity plane, the L* axis is perpendicular to the chromaticity plane and the L* axis in combination with the a* and b* axes provide a complete description of the color attributes of an object such as purity, hue and brightness. Using layman's terms, a highly colorful stimulus (color) is seen by the human eye as vivid and intense, while a less colorful stimulus appears more muted, closer to gray. With no "colorfulness" at all, a color is a "neutral" gray and an image with no colorfulness is typically referred to as an image in grayscale or a grayscale image. In addition, three attributes—colorfulness (also known as chroma or saturation), lightness (also known as brightness), and hue—colors can be described.

The color map shown in FIG. 5 has a targeted color area of hue equal to the inverse tangent of (b*/a*)=280. The lines shown in the figure correspond to color travel when viewed from between 0 to 80 degrees. In addition, the lines corresponded to first and second harmonics related to dielectric layer thicknesses of 1.67 QW and 3 QW, respectively. As shown in the figures, the lines corresponding to the first harmonic and 1.67 QW dielectric layer thickness correspond to a lower angular shift of hue and thus a more desired omnidirectional behavior of the multilayer structure.

Figure 6A:
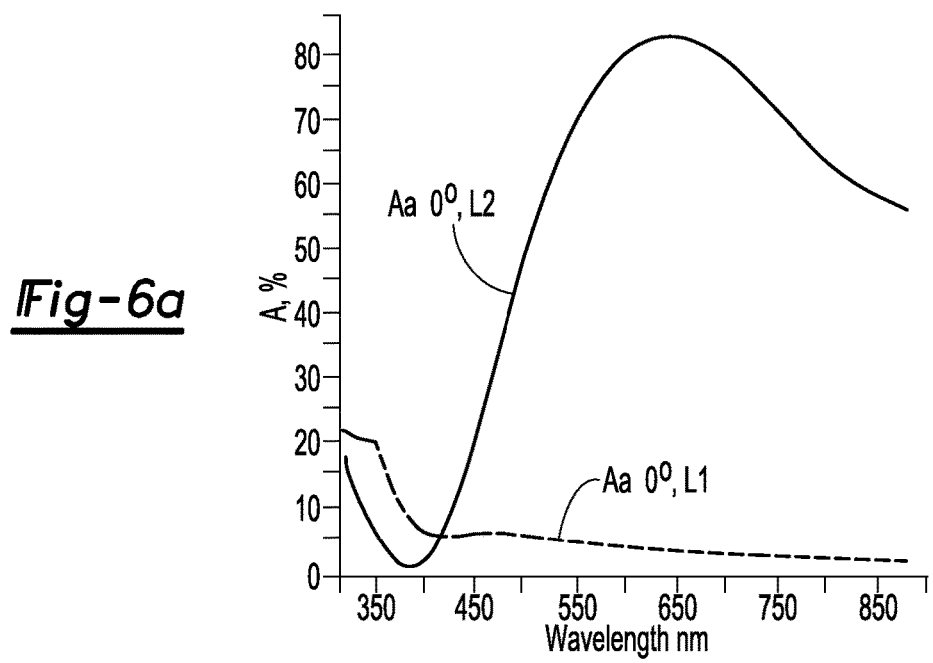
FIGS. 6a-6c are graphical representations for the embodiment shown in FIG. 3(a) illustrating: (a) absorbance versus incident light wavelength for the dielectric layer (L1) and absorber layer (L1) shown in FIG. 2(a); (b) reflectance versus incident light wavelength for the embodiment shown in FIG. 3(a) when viewed at 0 and 45 degrees; and (c) hue and chroma versus incident angle.
Figure 6B:
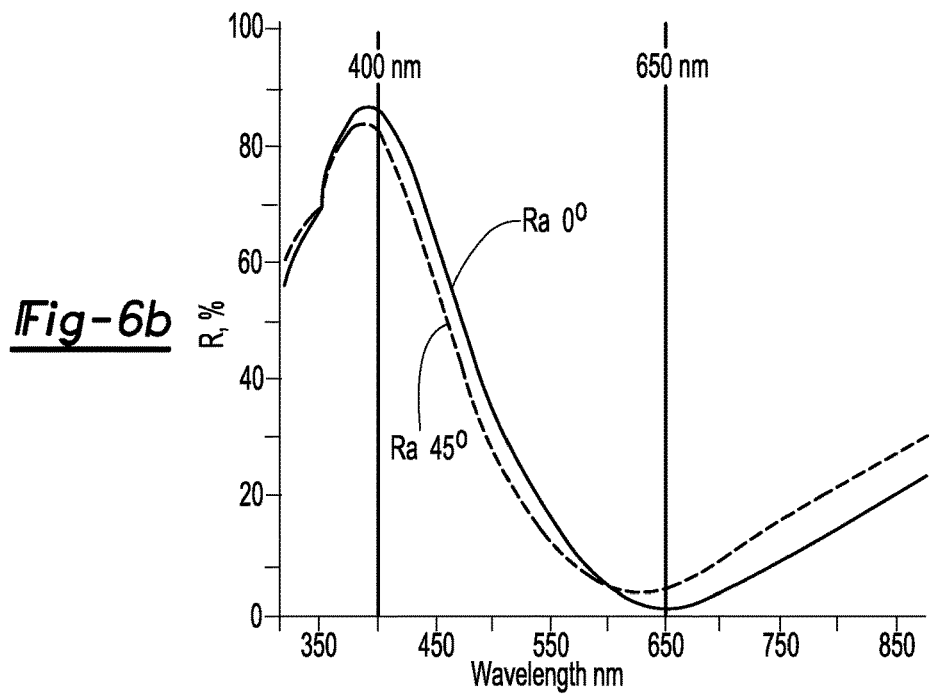

Referring to FIG. 6, FIG. 6(a) provides a graphical representation of absorption versus incident electromagnetic radiation wavelength for the dielectric layer 110 and the absorber layer 120. As shown in the figure, the absorber layer 120 has a very low percentage of absorption at an incident wavelength of approximately 400 nm and a very high absorption for incident wavelengths in the 600-700 nm range. In addition, there is a relatively sharp increase in absorption between the 400 nm to 600-700 nm range, which provides a sharp cutoff of light wavelengths passing through the dielectric layer 110 to be reflected by the core layer 100. This sharp cutoff corresponds to the graphical representation shown in FIG. 6(b) in which a single narrow band of electromagnetic radiation is reflected in the visible spectrum in the 400 nm range. FIG. 6(b) also illustrates that there is a very low shift in the center wavelength (400 nm) of the reflected band of electromagnetic radiation when viewed from 0 and 45 degrees. It is appreciated that the narrow band of reflected electromagnetic radiation has a width of less than 200 nm at a location measured at 50% of reflectance compared to the maximum reflectance point/wavelength. In addition, the narrow reflected band has a width of less than 100 nm when measured at 75% of the maximum reflectance for the 400 nm wavelength.

Figure 6C:
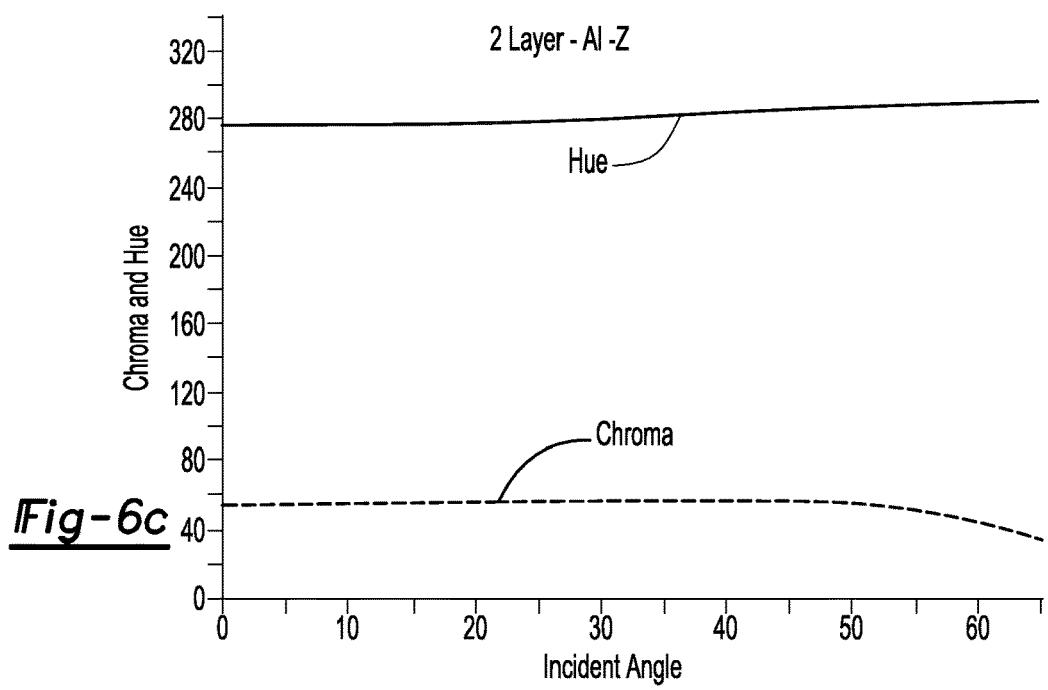

With respect to the hue and chroma of the multilayer structure, FIG. 6(c) illustrates a very small change in the hue and chroma as a function of incident viewing angle. In addition, the chroma is maintained between 58 and 60 for all angles between 0 and 45.

Figure 7A:
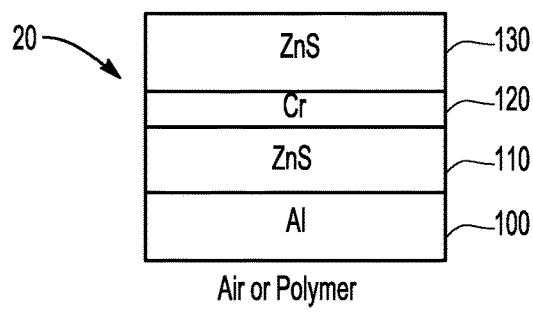
FIGS. 7a-7d are: (a) a schematic illustration of another embodiment according to the invention; (b) a graphical representation of refractive indices for the structure shown in (a); (c) a graphical representation of electric field through the thickness of the embodiment shown in (a) for an incident light wavelength of 420 nm; and (d) an electric field across the thickness of the embodiment shown in (a) a graphical representation of electric field through the thickness of the embodiment shown in (a) for an incident light wavelength of 560 nm.
Figure 7B:
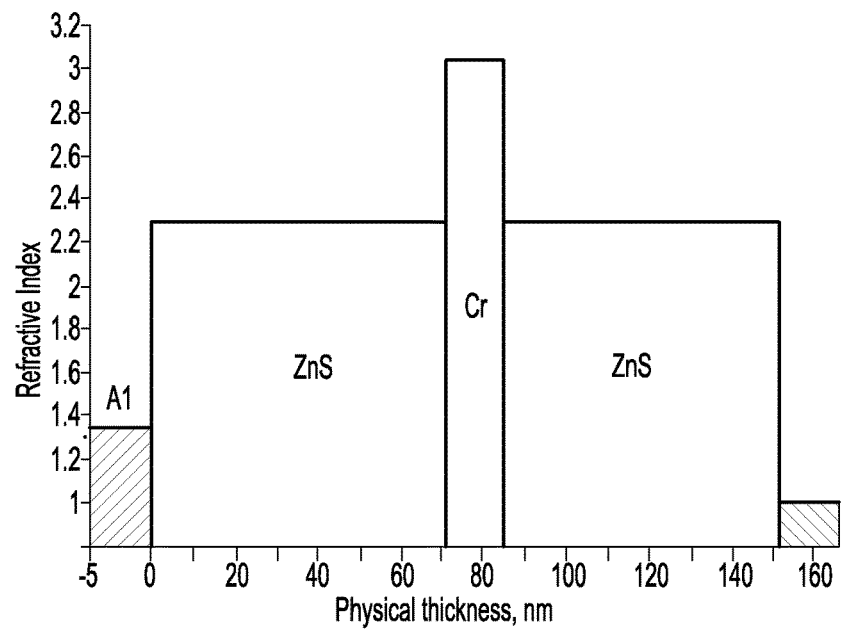
Figure 7C:
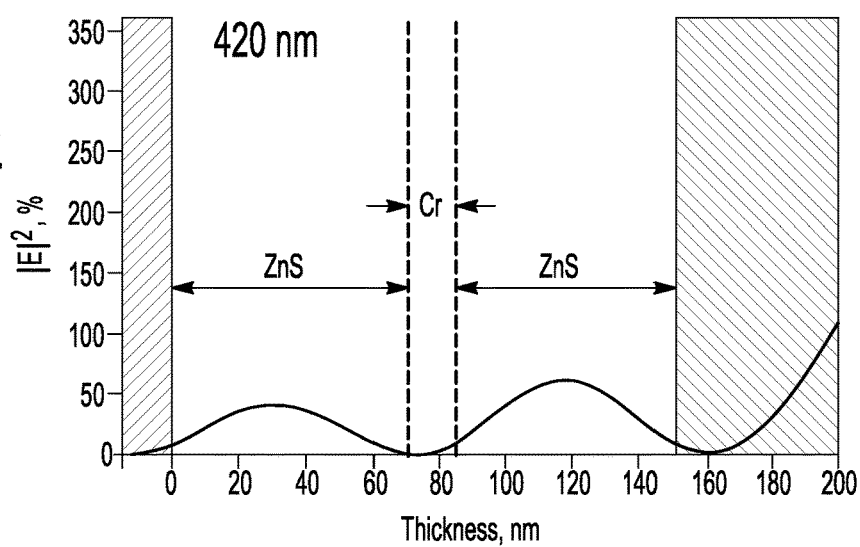
Figure 7D:
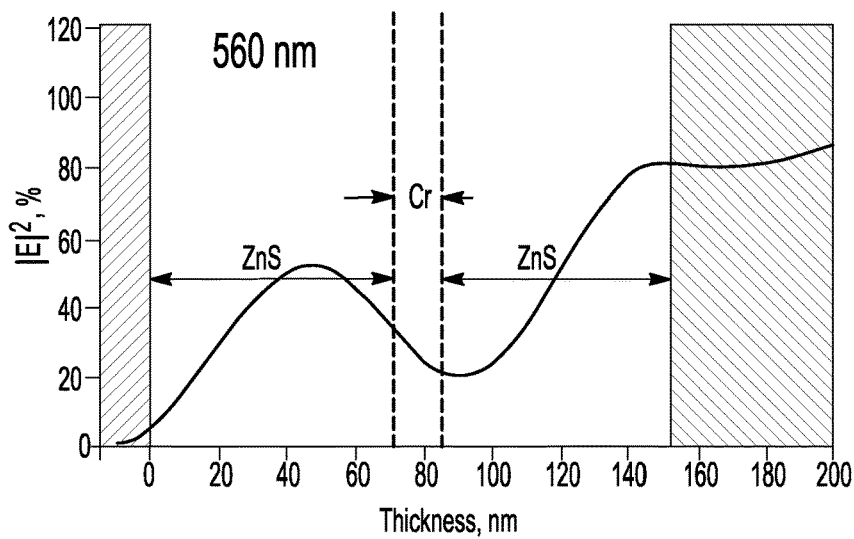

Turning now to FIG. 7, another embodiment of the present invention is shown at reference numeral 20 in FIG. 7(a). The multilayer structure 20 has a second dielectric layer 130 that extends across an outer surface of the absorber layer 120. FIG. 7(b) provides a graphical representation of the index of refraction for the various layers of the structure 20 whereas FIG. 7(c) illustrates the electric field as a function of the thickness along the structure 20 for an incident wavelength of 420 nm. Finally, FIG. 7(d) provides a graphical representation of the electric field as a function of thickness across the multilayer structure 20 for an incident wavelength of 560 nm. As shown in FIGS. 7(c) and 7(d), the electric field is near-zero for the 420 nm wavelength but is relatively large or high for the 560 nm wavelength. As such, an omnidirectional narrow band of reflected electromagnetic radiation is provided by the multilayer structure 20.

Figure 8A:
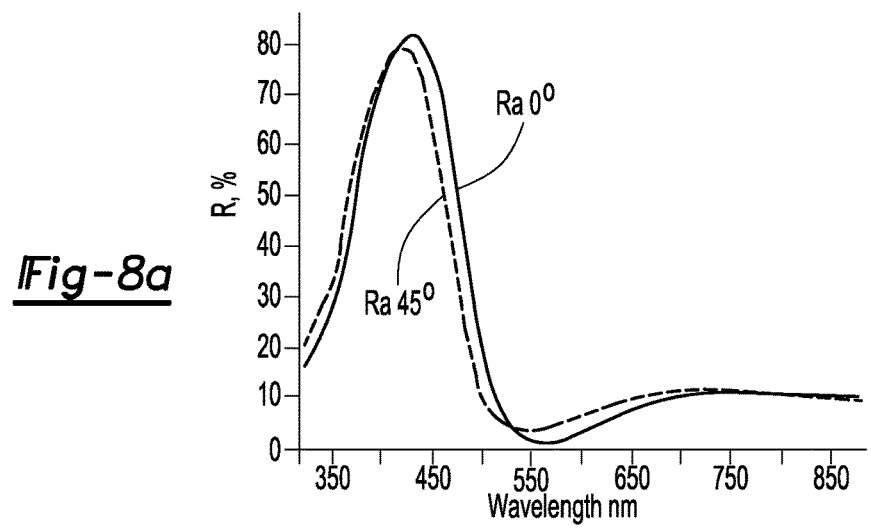
FIGS. 8a-8c are graphical representations of: (a) reflectance versus incident light wavelength for the embodiment shown in FIG. 7(a) when viewed from 0 and 45 degrees; (b) absorbance versus incident light wavelength for the layers shown in the embodiment of FIG. 7(a); and (c) reflectance versus incident angle of hue and chroma for the embodiment shown in FIG. 7(a)
Figure 8B:
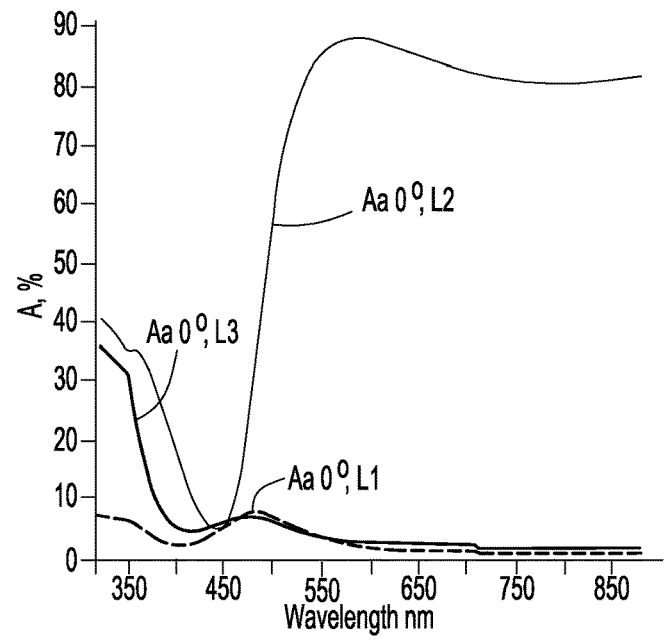
Figure 8C:
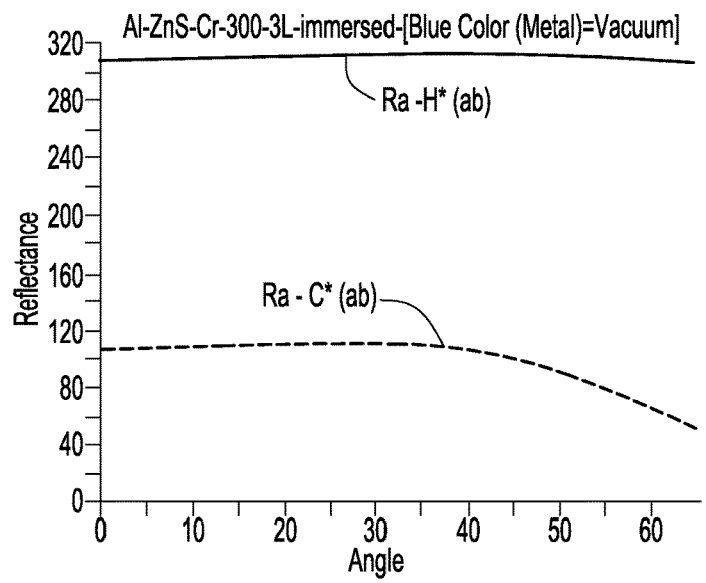

Referring to FIG. 8, FIG. 8(a) provides a graphical representation of the shift in the center wavelength (400 nm) of the single reflected band of electromagnetic radiation in the visible spectrum from the structure shown in FIG. 9(a) when viewed from 0 and 45 degrees. The absorption versus incident electromagnetic radiation wavelength for the dielectric layer 110 and the absorber layer 120 is shown in FIG. 8(b) and the hue and chroma as a function of viewing angle shown in FIG. 8(c).

Referring now to FIG. 9, schematic illustrations of two multilayer structures are shown at reference numerals 12 and 22. The multilayer structure 12 shown in FIG. 9(a) is essentially identical to the embodiment 10 discussed above except that there is another dielectric layer 110a and absorber layer 120a on an opposite side of the core layer 100. In addition, the multilayer structure 22 shown in FIG. 9(b) is essentially the same as the multilayer structure 20 discussed above except for another dielectric layer 110a, absorber layer 120a, and dielectric layer 130a on an opposite side of the core layer 100. In this manner, the core layer 100 has both external surfaces covered by a multilayer structure.

Referring to the graphical plot shown in FIG. 9(c), reflectance versus incident electromagnetic radiation wavelength is shown for just an aluminum core layer (Al Core), an aluminum core layer plus a ZnS dielectric layer (Al Core+ZnS), a five layer aluminum core plus ZnS plus chromium structure (Al Core+ZnS+Cr (5L)) as shown by embodiment 12, and a seven layer aluminum core plus ZnS plus chromium plus ZnS structure (Al Core+ZnS+Cr+ZnS (7L)) as illustrated by embodiment 22. As shown in the figure, the seven layer structure 22 with the pair of dielectric layers and the absorber layer therebetween provides a more narrow and well defined reflection band of electromagnetic radiation compared to the other structures.

Figure 10:
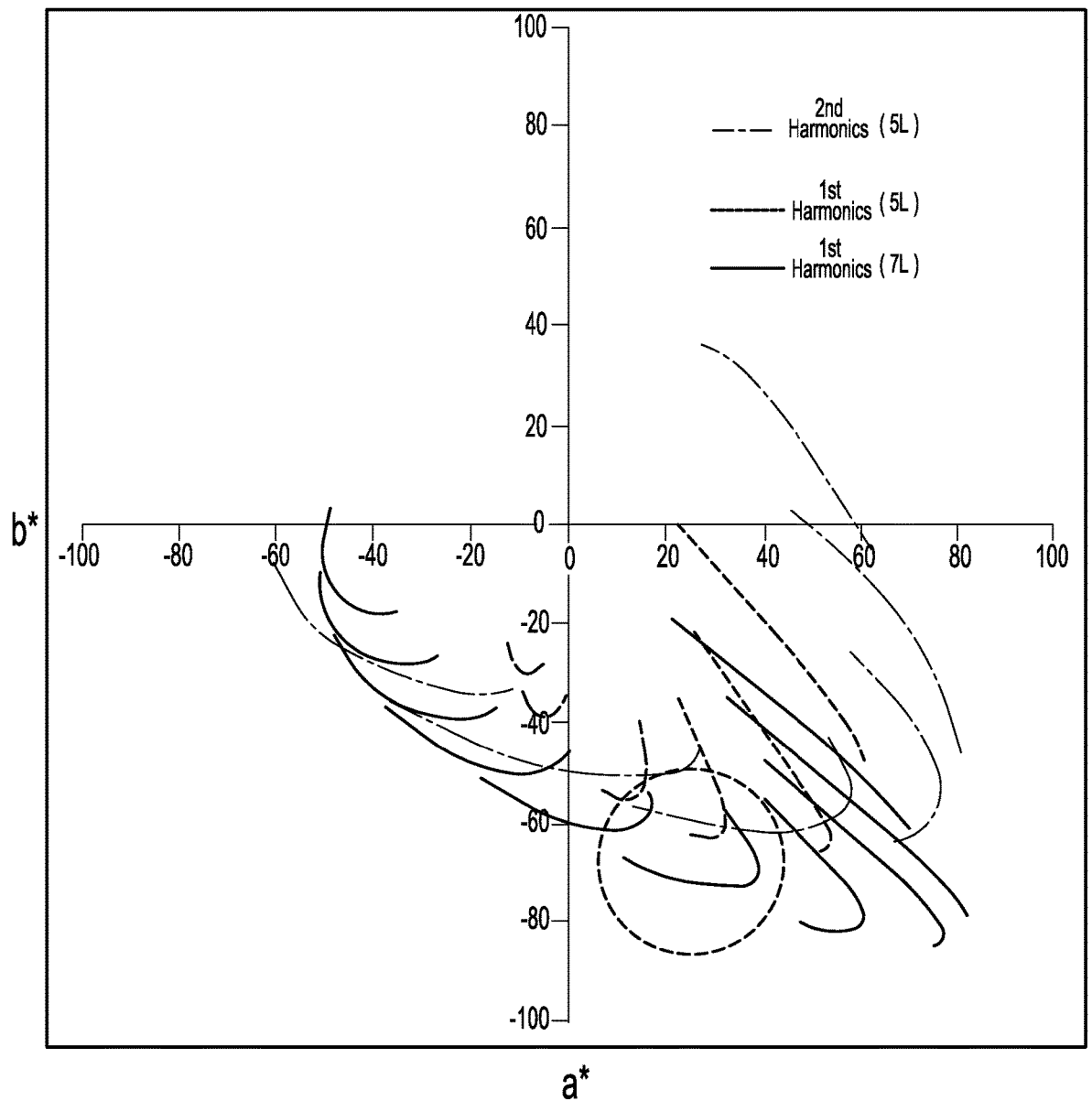
FIG. 10 is a graphical representation of a comparison between color properties in an a*b* color map for a target color area of hue equal to 80 for the 5-layer structure shown in FIG. 8(a) having dielectric layer(s) thickness(es) that afford(s) for reflection of the 1$^{st}$ and 2$^{nd}$ harmonics of a desired narrow band of reflected light, the 5-layer structure shown in FIG. 9(a) having dielectric layer(s) thickness(es) that afford(s) for only the 1$^{st}$ harmonic of a desired narrow band of reflected light, and the 7-layer structure shown in FIG. 9(a) having dielectric layer(s) thickness(es) that afford(s) for only the 1$^{st}$ harmonic of a desired narrow band of reflected light.

FIG. 10 provides an a*b* color map for a five layer structure that has dielectric thicknesses that afford for second harmonics, a five layer structure that has dielectric thicknesses that afford for only a first harmonic, and a seven layer structure with dielectric layer thicknesses that afford for only a first harmonic. As shown by the dotted circle in the figure which represents the target color area, the lines correspond to the seven layer structure with the first harmonic correspond to lower angular shift of hue when compared to the lines representing the other structures.

Figure 11:
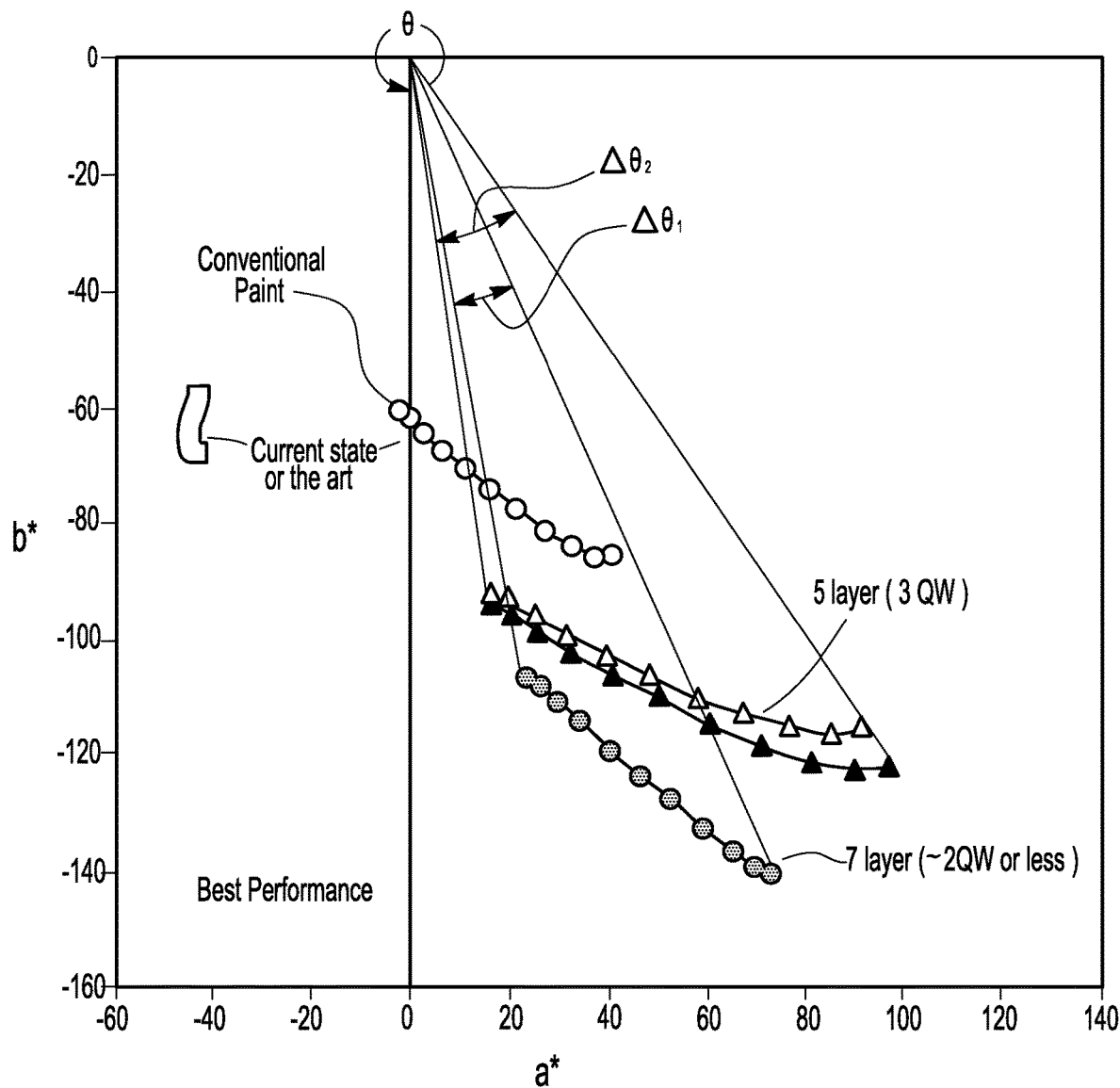
FIG. 11 is a graphical representation of a comparison between current state of the art multilayer structures and multilayer structures provided by embodiments of the present invention on an a*b* color map.

A comparison of current state of the art layered structures, two five layer structures that have a dielectric layer with an optical thickness of greater than 3 QW (hereafter referred to as 5 layer>3 QW) and a seven layer structure having at least one dielectric layer with an optical thickness of less than 2 QW (hereafter referred to as 7 layer<2 QW structure) and produced or simulated according to an embodiment of the present invention is shown on an a*b* color map in FIG. 11. As shown in the figure, the current state of the art structures and 5 layer>3 QW structures are greatly improved upon by the 7 layer<2 QW structure disclosed herein. In particular, the chroma ($C^* = \sqrt{a^2+b^2}$) is greater for the 7 layer<2 QW structure than for the 5 layer>3 QW structure. In addition, the hue shift ($\Delta\theta$) is approximately half for the 7 layer<2 QW structure ($\Delta\theta_1$) compared to the 5 layer>3 QW structure ($\Delta\theta_2$).

Table 1 below shows numerical data for the 5 layer>3 QW and 7 layer<2 QW structures. It is appreciated that those skilled in the art recognize that a 1 or 2 point increase in chroma (C*) is a significant increase with a 2 point increase being visually recognizable to the human eye. As such, the 6.02 point increase (16.1% increase) exhibited by the 7 layer<2 QW structure is exceptional. In addition, the hue shift for the 7 layer<2 QW structure (15°) is approximately half the hue shift of the 5 layer>3 QW structure (29°). Thus given the approximately equal lightness (L*) between the two structures, the 7 layer<2 QW structure provides a significant and unexpected increase in color properties compared to prior art structures.

TABLE 1

| Property | 5 layer (>3 QW) | 7 Layer (<2 QW) |
| --- | --- | --- |
| L* | 36.03 | 36.85 |
| C* | 37.42 | 43.44 |
| Hue | 279° | 281° |
| Color Shift | 29° | 15° |

Figure 12A:
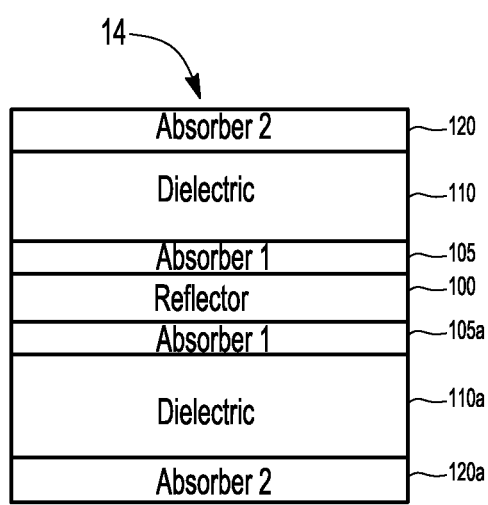
FIGS. 12a-12b are schematic illustrations of: (a) a 5-layer multilayer structure according to an embodiment of the present invention; and (b) 7-layer multilayer structure according to an embodiment of the present invention.
Figure 12B:
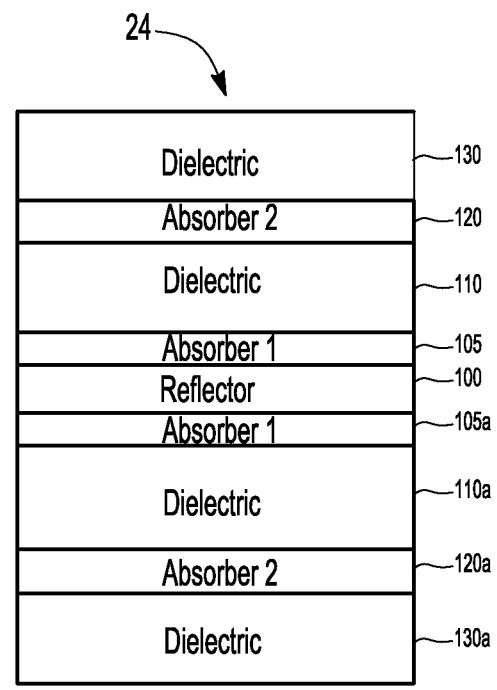

Another embodiment of a high chroma omnidirectional structural color multilayer structure is shown generally at reference numeral 14 in FIG. 12(a). The multilayer structure 14 is similar to the embodiment 10 except for additional absorber layers 105 and 105a between the reflector layer 100 and the dielectric layers 110 and 110a, respectively. Another embodiment is shown at reference numeral 24 in FIG. 12(b) which is similar to embodiment 20 except for the addition of the absorber layers 105, 105a between the reflector or core layer 100 and the dielectric layers 110, 110a, respectively.

Pigments from such multilayer structures can be manufactured as a coating on a web with a sacrificial layer having subsequent layers of materials deposited thereon using any kind of deposition method or process known to those skilled in the art including electron-beam deposition, sputtering, chemical vapor deposition, sol-gel processing, layer-by-layer processing, and the like. Once the multilayer structure has been deposited onto the sacrificial layer, freestanding flakes having a surface dimension on the order of 20 microns and a thickness dimension on the order of 0.3-1.5 microns can be obtained by removing the sacrificial layer and grinding the remaining multilayer structure into flakes. Once the flakes have been obtained, they are mixed with polymeric materials such as binders, additives, and base coat resins to prepare omnidirectional structural color paint.

The omnidirectional structural color paint has a minimum color change with a hue shift of less than 30 degrees. Such a minimum hue shift should be appreciated to appear to be omnidirectional to a human eye. The definition of hue as $\tan^{-1}(b^*/a^*)$ where a* and b* are color coordinates in the lab color system.

In summary, the omnidirectional structural color pigment has a reflector or core layer, one or two dielectric layers, and one or two absorber layers with at least one of the dielectric layers having a typical width greater than 0.1 QW but less than or equal to 2 QW where the control wavelength is determined by the target wavelength at the peak reflectance in the visible spectrum. In addition, the peak reflectance is for the first harmonic reflectance peak and provides a single reflected band in the visible spectrum. In some instances, the width of the one or more dielectric layers is greater than 0.5 QW and less than 2 QW. In other instances, the width of one or more dielectric layers is greater than 0.5 QW and less than 1.8 QW.

The above examples and embodiments are for illustrative purposes only and changes, modifications, and the like will be apparent to those skilled in the art and yet still fall within the scope of the invention. As such, the scope of the invention is defined by the claims.

We claim:

1. A high-chroma omnidirectional structural color multilayer structure comprising:

a multilayer stack having:
a core layer;
a dielectric layer extending across said core layer; and
an absorber layer extending across said dielectric layer with an interface therebetween;
said interface between said dielectric layer and said absorber layer having a near-zero electric field at a first incident electromagnetic wavelength and a large electric field at a second incident electromagnetic wavelength, said second incident electromagnetic wavelength not equal to said first incident electromagnetic wavelength,
said multilayer stack having a single narrow reflection band with a full width half maximum (FWHM) width of less than 200 nanometers in the visible spectrum and a minimum color change with a hue shift of less than 30 degrees when viewed from angles between 0 and 45 degrees that provides a high-chroma omnidirectional structural color;
said dielectric layer having a thickness of less than or equal to 2 quarter wave (QW) of a center wavelength of said narrow reflection band.

2. The high-chroma omnidirectional structural color multilayer structure of claim 1, wherein said core layer has a complex refractive index represented by the expression $RI_1 = n_1 + ik_1$ with $n_1 \ll k_1$, where $RI_1$ is said complex refractive index, $n_1$ is a refractive index of said core layer, $k_1$ is an extinction coefficient of the said core layer and $i$ is $-1$.

3. The high-chroma omnidirectional structural color multilayer structure of claim 2, wherein said core layer is made from a material selected from the group consisting of silver, copper, chromium aluminum, gold and alloys thereof.

4. The high-chroma omnidirectional structural color multilayer structure of claim 3, wherein said core layer is made from a material selected from the group consisting of said aluminum and said alloys thereof.

5. The high-chroma omnidirectional structural color multilayer structure of claim 4, wherein said core layer has a thickness between 50 and 200 nm.

6. The high-chroma omnidirectional structural color multilayer structure of claim 1, wherein said dielectric layer contains at least one of $TiO_2$, $MgF_2$, $ZnS$, $HfO_2$, $Nb_2O_5$, $Ta_2O_5$, $SiO_2$ and combinations thereof.

7. The high-chroma omnidirectional structural color multilayer structure of claim 6, wherein said dielectric layer is ZnS.

8. The high-chroma omnidirectional structural color multilayer structure of claim 7, wherein said absorber layer has a complex refractive index represented by the expression $RI_2 = n_2 + ik_2$ with $n_2 \approx k_2$, where $RI_2$ is said complex refractive index, $n_2$ is a refractive index of said dielectric layer, $k_2$ is an extinction coefficient of the said absorber layer.

9. The high-chroma omnidirectional structural color multilayer structure of claim 8, wherein said absorber layer is made from a material selected from at least one of chromium, tantalum, tungsten, molybdenum, titanium, titanium nitride, niobium, cobalt, silicon, germanium, nickel, palladium, vanadium, ferric oxide and alloys thereof.

10. The high-chroma omnidirectional structural color multilayer structure of claim 9, wherein said absorber layer is made from at least one of said chromium and said alloys thereof.

11. The high-chroma omnidirectional structural color multilayer structure of claim 10, wherein said absorber layer has a thickness between 5 and 20 nm.

12. The high-chroma omnidirectional structural color multilayer structure of claim 11, further comprising another dielectric layer extending across an outer surface of said absorber layer.

13. The high-chroma omnidirectional structural color multilayer structure of claim 12, further comprising another absorber layer between said core layer and said dielectric layer.

14. The high-chroma omnidirectional structural color multilayer structure of claim 11, further comprising another absorber layer between said core layer and said dielectric layer.

15. A high-chroma omnidirectional structural color multilayer structure comprising:
a multilayer stack having:
a core layer having a first outer surface and an oppositely disposed spaced apart second outer surface;
a first dielectric layer extending across said first outer surface and a second dielectric layer extending across said second outer surface of said core layer; and
a first absorber layer extending across said first dielectric layer and a second absorber layer extending across said second dielectric layer;
said multilayer stack having a near-zero electric field at a first interface between said first absorber layer and said first dielectric layer and at a second interface between said second absorber layer and said second dielectric layer;
said multilayer stack having a single narrow reflection band with a full width half maximum (FWHM) width of less than 200 nanometers in the visible spectrum and a minimum color change with a hue shift of less than 30 degrees when viewed from angles between 0 and 45 degrees that provides a high-chroma omnidirectional structural color;
said dielectric layer having a thickness of less than or equal to 2 quarter wave (QW) of a center wavelength of said narrow reflection band.

16. The high-chroma omnidirectional structural color multilayer structure of claim 15, wherein said core layer is made from a material selected from the group consisting of aluminum and alloys thereof.

17. The high-chroma omnidirectional structural color multilayer structure of claim 16, wherein said core layer has a thickness between 50 and 200 nm.

18. The high-chroma omnidirectional structural color multilayer structure of claim 15, wherein said dielectric layer contains at least one of $TiO_2$, $MgF_2$, $ZnS$, $HfO_2$, $Nb_2O_5$, $Ta_2O_5$, $SiO_2$ and combinations thereof.

* * * * *

UNITED STATES PATENT AND TRADEMARK OFFICE
CERTIFICATE OF CORRECTION

PATENT NO. : 10,690,823 B2
APPLICATION NO. : 13/913402
DATED : June 23, 2020
INVENTOR(S) : Debasish Banerjee, Minjuan Zhang and Masahiko Ishii It is certified that error appears in the above-identified patent and that said Letters Patent is hereby corrected as shown below:

On the Title Page

Item (71), applicant 2, city, delete "Toyota" and insert --Toyota Aichi--, therefor.

In page 2, Column 1, item (56), U.S. Patent documents, cite no. 41, delete "Phillips" and insert --Phillips et al.--, therefor.

In page 4, Column 1, item (56), other publications, cite no. 11, delete "Tachnique" and insert --Technique--, therefor.

In the Specification

In Column 5, Line 6, delete "$E(d)=\{u(z),0,0\}\exp(ik\alpha y)|_{z=d}$" and insert --  --, therefor.

Signed and Sealed this
Twenty-seventh Day of October, 2020

Andrei Iancu
*Director of the United States Patent and Trademark Office*